US008498954B2

(12) United States Patent
Malov et al.

(10) Patent No.: US 8,498,954 B2
(45) Date of Patent: Jul. 30, 2013

(54) MANAGING OPERATIONS OF A SYSTEM USING NON-LINEAR MODELING TECHNIQUES

(75) Inventors: Denis Malov, Scottsdale, AZ (US); Sricharan Poundarikapuram, Scottsdale, AZ (US)

(73) Assignee: SAP AG, Walldorf (DE)

( * ) Notice: Subject to any disclaimer, the term of this patent is extended or adjusted under 35 U.S.C. 154(b) by 296 days.

(21) Appl. No.: 13/073,536

(22) Filed: Mar. 28, 2011

(65) Prior Publication Data
US 2012/0254092 A1    Oct. 4, 2012

(51) Int. Cl.
*G06F 17/00* (2006.01)
*G06F 17/10* (2006.01)
*G06Q 10/00* (2012.01)

(52) U.S. Cl.
USPC .................................. 706/45; 703/2; 705/1.1

(58) Field of Classification Search
None
See application file for complete search history.

(56) References Cited

U.S. PATENT DOCUMENTS

| 2009/0144101 | A1 | 6/2009 | Malov |
| 2009/0144103 | A1 | 6/2009 | Malov et al. |
| 2009/0144123 | A1 | 6/2009 | Malov et al. |
| 2011/0173144 | A1 * | 7/2011 | Shan et al. ...................... 706/13 |

OTHER PUBLICATIONS

Extended European Search Report for EP Application No. 11004203.3, mailed Dec. 6, 2011, 4 pages.
"Economics 5000, Time Series Analysis: Modeling and Forecasting Seasonality", 2009, pp. 1-5.
Chen et al., "Evolutionary product line design balancing customer needs and product commonality", CIRP Annals—Manufacturing Technology, vol. 58, 2009, pp. 123-126.
Cross et al., "Customer-centric pricing: The surprising secret for profitability", Business Horizons, vol. 48, No. 6, Nov.-Dec. 2005, pp. 483-491.
Chaneton et al., "Computing Bid-Prices for Revenue Management under Customer Choice Behavior", May 7, 2009, 67 pages.
Verdu et al., "Characterization and Identification of Electrical Customers Through the Use of Self-Organizing Maps and Daily Load Parameters", IEEE PES, Power Systems Conference and Exposition, Oct. 2004, pp. 899-906.

* cited by examiner

*Primary Examiner* — Alan Chen
(74) *Attorney, Agent, or Firm* — Brake Hughes Bellermann LLP

(57) ABSTRACT

A computer-implemented method for managing operations of a system includes deriving a nonlinear modeling function from a nonlinear response function, defining an allowed range for output values of the nonlinear modeling function, determining a range of a first set of input values of the nonlinear modeling function based on the allowed range of the output values, deriving a nonlinear probability function from the nonlinear response function, receiving the first set of input values, calculating the output values by processing each input value in the first set of input values through the nonlinear modeling function, determining, using the probability function, a relative probability of performing a first future system operation for each input value of the first set of input values and displaying, for each input value in the first set of input values, the corresponding output value and the corresponding probability.

20 Claims, 8 Drawing Sheets

Product Example

| Demand Type | FICO Range | Custom FICO Range | Channel | Lien Position |
|---|---|---|---|---|
| Home Equity Lone | 620-659 | 620-639 | BFS Financial Center | 1st Lien |

| Market Group | CLTV Range | Balance Tier | Term Range |
|---|---|---|---|
| Arizona | 0-80% | <$20,000 | 8-10 Years |

FIG. 2

Pricing Event : MTG AL GA ASR   Help

Parameters  Event Name  MTG AL GA ASR  Product Type  Mortgage  Demo USD  Status  Completed  Process  Build Price-File
Associated Segment Rules  LTV pricing  Effective Date  17.09.2010  Movement Rules  35/15  120/150

[ Save ]  [ Edit ]  [ Close ]  [ Read only ]  [ Refresh ]

Event Overview / Goal Management / Event Detail

Main Parameters

Event Name  MTG AL GA ASR
Event Data  17.09.2010
Created By  Frank Fillmann
Created Date  17.09.2010
Market Group  Alabama, Georgia

Business Rules

Movement Rules  35/15  120/150
Associated Segment Rules  LTV pricing
Associated Variable Rules

Science Parameters

Modeling Version  9/16
Optimization Variable  Rate, Fees

Event Total — 409

| KPI | Current | Optimal | User | Optimal-Current | User-Optimal | User-Current |
|---|---|---|---|---|---|---|
| Annual Profit (USD) | 3,171,803.63 | 12,811,818.09 | 12,811,818.09 | 9,640,014.46 | 0.00 | 9,640,014.46 |
| Unit Sales (Unit) | 8,429.17 | 10,738.94 | 10,738.94 | 2,309.77 | 0.00 | 2,309.77 |
| Mortgage Production(... | 2,160,958,984.02 | 2,684,259,542.66 | 2,684,259,542.66 | 577,300,558.64 | 0.00 | 577,300,558.64 |

— 405  — 403  — 407  — 411  — 401

[ Save ]  [ Edit ]  [ Close ]  [ Read only ]  [ Refresh ]

MANAGING OPERATIONS OF A SYSTEM USING NON-LINEAR MODELING TECHNIQUES

TECHNICAL FIELD

This description relates to optimization techniques for managing operations of a system.

BACKGROUND

Detailed scientific analysis in the form of modeling (e.g. demand modeling), and the discrimination of variables (e.g. optimal pricing variables), has often been used. However, actual customer transactions involve deal negotiations and customer focused pricing steps that can result in significant deviations from an optimal price.

Modeling and planning (e.g. economic and financial modeling) are commonly used to estimate or predict the performance and outcome of real systems, given specific sets of input data of interest. A modeled system (e.g. an economic-based system) may have many variables and influences (e.g. factors or inputs) which determine its behavior. A model is a mathematical expression or representation which predicts the outcome or behavior of the system under a variety of conditions. It is possible to review a historical data set, understand its past performance, and state with relative certainty that the system's past behavior was indeed driven by the historical data set. A more difficult task is to generate a mathematical model of the system which predicts how the system will behave, or would have behaved, with different sets of data and assumptions. While forecasting and backcasting using different sets of input data is inherently imprecise, i.e., no model can achieve 100% certainty, the field of probability and statistics has provided many tools which allow such predictions to be made with reasonable certainty and acceptable levels of confidence. Backcasting may be understood as starting from a desirable future and identifying ways to achieve the desirable future.

SUMMARY

According to an aspect, a computer implemented method of managing operations of a system is provided. The method may include deriving a nonlinear modeling function from a nonlinear response function, where the nonlinear modeling function models an affinity between multiple variables, where the multiple variables define one or more characteristics of the operations of the system, and where the nonlinear modeling function approximates one or more operations of the system. The method may further include defining an allowed range for output values of the nonlinear modeling function. The method may further include determining a range of a first set of input values of the nonlinear modeling function based on the allowed range of the output values, where a boundary of the range of the first set of input values is an optimal input value, where the optimal input value can be processed through the nonlinear modeling function to produce an optimal output value. The method may further include deriving a nonlinear probability function from the nonlinear response function. The method may further include receiving the first set of input values. The method may further include calculating the output values by processing each input value in the first set of input values through the nonlinear modeling function. The method may further include determining, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value. The method may further include displaying, for each input value in the first set of input values, the corresponding output value and the corresponding probability.

The probability of the first future system operation may be represented as a relative weight.

The computer implemented method may also be suitable for optimizing key performance indicators of financial products.

Also, the nonlinear modeling function may model product affinity and/or cannibalization.

In addition, the input values may replace an optimization pricing variable when calculating the output values.

Moreover, the output values may be key performance indicators. The allowed range for the output values may be received by means of user input.

The first future system operation may be completion of a deal or transaction with a customer.

In some cases, the method further includes using techniques of unobserved component models are used in the nonlinear modeling function in order to provide a serial correlation between events that have a close chronological relationship.

Serial correlation may be understood to refer to a relationship between the values of a variable over successive time intervals.

In some cases, the method further includes collecting a historical data set from the operations of the system. The method may further include loading the historical data set into a database. Deriving the nonlinear modeling function may include using the historical data set.

The historical data set may include client data, external data, and/or macroeconomic indicators. Operations of the system may be customer transactions.

Also, it may be that loading the historical data set further includes aggregating and clustering the historical data set.

Moreover, processing the first set of input values may include replacing a first variable of the nonlinear modeling function with each value in the first set of input values. Each output value may be calculated using an input value in the first set of input values.

Calculating the output values may further include processing a second set of input values through the nonlinear modeling function. Also, processing the second set of input values includes replacing a second variable of the nonlinear modeling function with each value in the second set of input values. Each output value may be calculated using an input value in the second set of input values.

Furthermore, the range of the first set of input values is determined based on one or more of the following: movement rules, linear constraints based on business rules, and nonlinear constraints based on portfolio level rules.

Also, the method may further include deriving a linear modeling function from a linear utility function. The method may further include calculating output values of the linear modeling function by processing the first set of input values through the linear modeling function. Moreover, displaying the corresponding output value and the corresponding probability may further include displaying, for each input value of the first set of input values, the corresponding output value of the linear modeling function.

It may be that calculating the output values includes performing an approximation. Accordingly, the method may further include modifying the nonlinear modeling function when the calculated output values do not correspond to a degree of the nonlinear modeling function.

Moreover, the method may further include determining a number of future system operations performed based on the relative probability of performing the first future system operation and the output of a segmentation model based on customer relationship management attributes.

In addition, the method the nonlinear modeling function may be $$\frac{\text{Exp}(\beta_{client} r_{client}(t))}{\text{Exp}(\beta_{comp} r_{comp}(t)) + \text{Exp}(\beta_{client} r_{client}(t))},$$

where $r^{client}(t)$ is the first variable, where $r^{comp}(t)$ is given a constant value, and where $\beta$ is sensitivity of the output values to a change in $r^{client}(t)$.

Moreover, the probability function may be $$\text{Exp}(\beta_i(X_i(\text{DDS}) - X_i(\text{Opt}))),$$

where, when calculating the output values, $X_i(\text{DDS})$ is replaced by each input value in the first set of input values, and where $X_i(\text{Opt})$ is replaced by the optimal input value, and wherein $\beta_i$ is the sensitivity of $X_i$.

In some cases, the method further includes deriving a multinomial logit function from the nonlinear response function. The method may further include processing the input values through the multinomial logit function in order to determine a relative probability of a second future system operation.

The second future system operation may be a situation where a user faces multiple choices.

According to another aspect, a computer program product including computer-readable instructions is provided. The computer-readable instructions, when loaded and executed on a computer system, cause the computer system to operate according to the method described above.

According to yet another aspect, a computer system for managing the operations of a system is provided. The computer system may include a database configured to store a historical data set, a processor, and a graphical user interface. The processor may be configured to execute instructions that cause the computer system to perform the following operation: derive a nonlinear modeling function from a nonlinear response function, where the nonlinear modeling function models an affinity between multiple variables, where the multiple variables define one or more characteristics of the operations of the system, and where the nonlinear modeling function approximates one or more operations of the system. In addition, the processor may be configured to execute instructions that cause the computer system to perform the following operations: define an allowed range for output values of the nonlinear modeling function, and determine a range of a first set of input values of the nonlinear modeling function based on the allowed range of the output values, where a boundary of the range of the first set of input values is an optimal input value, where the optimal input value can be processed through the nonlinear modeling function to produce an optimal output value. Also, the processor may be configured to execute instructions that cause the computer system to perform the following operations: derive a nonlinear probability function from the nonlinear response function, receive the first set of input values, and calculate the output values by processing each input value in the first set of input values through the nonlinear modeling function. The processor may also be configured to execute instructions that cause the computer system to perform the following operation: determine, using the probability function, a relative probability of performing a first future system operation for each input value of the first set of input values, where, for each input value of the first set of input values, the relative probability shows a probability of performing the first future system operation for the corresponding input value relative to a probability of performing the first future system operation for the optimal input value. The graphical user interface may be configured to display, for each input value in the first set of input values, the corresponding output value and the corresponding probability.

The details of one or more implementations are set forth in the accompanying drawings and the description below. Other features will be apparent from the description and drawings, and from the claims.

BRIEF DESCRIPTION OF THE DRAWINGS

FIG. 2 depicts an example of the use of product segmentation in order to define a product as a combination of attributes.

FIG. 4 depicts a graphical user interface showing characteristics of a future system operation.

FIG. 6 shows input values, output values calculated using the input values, and probabilities of future system operations based on conditions defined by the input values.

DETAILED DESCRIPTION

Figure 1:
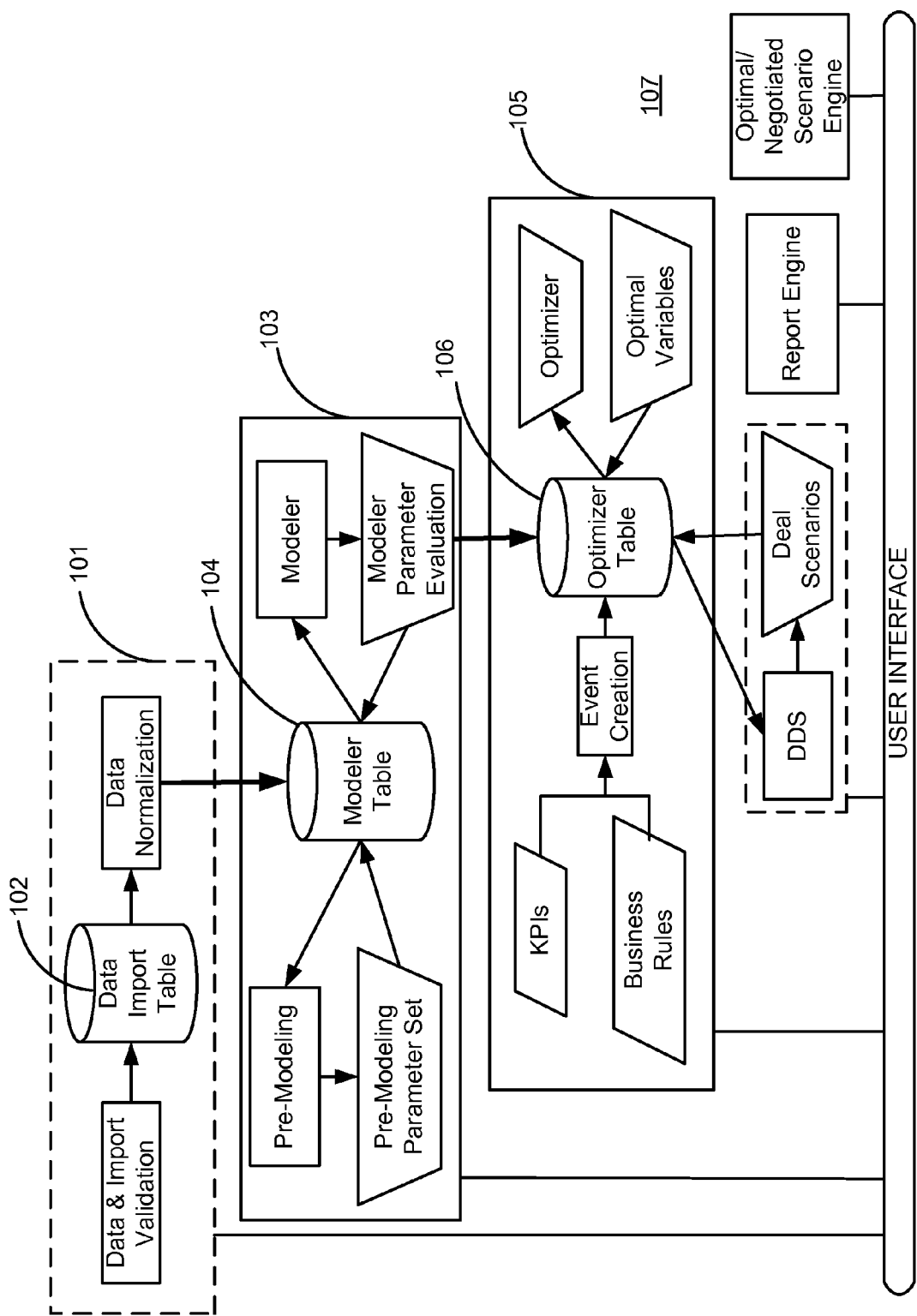
FIG. 1 depicts a process of economic modeling, optimization, and negotiation separated into four phases.

The system being modeled in the present application may also be referred to as a real system or a technical system. In a specific example, the system may be a financial service, such as the provision, determination or servicing of an adjustable mortgage. The system being modeled should be distinguished from the computer system used to implement the model.

In its basic form, the model can be viewed as a predicted or anticipated outcome of a mathematical expression, as driven by a given set of input data and assumptions. The input data (or input values) is processed through the mathematical expression representing either the expected or current behavior of the real system. The mathematical expression is formulated or derived from principles of probability and statistics, often by analyzing the historical data set and corresponding known outcomes, to achieve a best fit of the expected behavior of the system to other sets of data, both in terms of forecasting and backcasting. In other words, the model should be able to predict the outcome or response of the system to a specific set of data being considered or proposed, within a level of confidence, or an acceptable level of uncertainty.

Modeling (e.g. economic modeling) has many uses and applications. One emerging area in which modeling has exceptional promise is the financial services industry. Banks, credit unions, savings and loan, commercial lenders, investment houses, and brokerage firms face stiff competition for limited customers and business. Most if not all financial service institutions make every effort to maximize sales, volume, revenue, and profit. Economic modeling is a tool that can be used to effectively achieve these goals.

The subject matter described in this document can be implemented as a method or as a system, possibly in the form of one or more computer program products. The subject matter described in this document can be implemented in a data signal or on a non-transitory machine readable medium, where the medium is embodied in one or more information carriers, such as a CD-ROM, a DVD-ROM, a semiconductor memory, or a hard disk. Such computer program products may cause a data processing apparatus to perform one or more operations described in this document.

In addition, subject matter described in this document can also be implemented as a system including a processor, and a memory coupled to the processor. The memory may encode one or more programs to cause the processor to perform one or more of the methods described in this document. Further subject matter described in this document can be implemented using various machines.

In the following text, a detailed description of examples will be given with reference to the drawings. It should be understood that various modifications to the examples may be made. In particular, elements of one example may be combined and used in other examples to form new examples.

Techniques described in the present application may relate to modeling (e.g. economic modeling), more particularly, to optimizing key performance indicators of products and portfolios with realistic business roles for deal negotiation scenarios and determination of customer centric pricing of products and services offered by companies.

Customer centric pricing can be achieved through a combination of data mining and econometric modeling analysis. Initially, data clustering and association analysis can be used to define segmentation models that correlate a specific customer to a unique demand profile. Subsequently, an econometric model can be built and applied to determine underlying functional forms and demand parameters such as elasticity. Supervised customer centered price management and deal decision support during a negotiation phase can be accomplished by defining objective functions that represent key performance indicators (KPIs). Each objective function may depend on a full set or a subset of pricing variables of the underlying econometric model. In the end, an entire portfolio of products can be optimized under the constraints or thresholds defined by the KPIs in order to produce customer centric pricing variables. An objective function may be implemented as a linear function (e.g. a utility function) or a nonlinear function (e.g. a response function).

Demand modeling and customer segmentation can be used to provide a framework for using a historical data set, efficient mathematical functional forms, and accurate forecasts for short and medium range planning. Techniques described in the present application can be used in customer centric aspects of point of sale planning and extension of demand models by using additional functional forms that calculate the probability of winning a quote, i.e. completing a deal. The present application also relates to a deal decision support (DDS) system that can be used to specify KPIs and define objective functions. In addition, the DDS system can be used for modeling functional forms and parameters, optimization variables, and business rules, as well as threshold ranges for optimization variables and KPIs during negotiation. Although some examples provided in the present application refer to the financial services industry, it should be noted that the approach described can be used in any industry sector that has customer centric pricing and can determine optimal prices based on the historical data set (e.g. demand modeling of the historical data set). In particular, customer centric pricing may align a price charged with the value created for a specific customer segment and a relevant time and place. Customer centric pricing may involve assessment of product attributes, customer perceptions, and circumstances of time and place.

In some cases, the historical data set is an aggregation of historical data.

The overall economic modeling process includes an estimation of pricing sensitivities of consumer demand for products, the use of economic models in predicting system operations, e.g. future sales, and the optimization of multiple variables in order to maximize values of different conflicting business objectives (i.e. KPIs of services or products). In particular, a system operation (or future system operation) may have an effect on one or more KPIs. The effect may be determined using output values from the model. Accordingly, KPIs may conflict with each other. Each KPI may be understood as a numerically quantified business objective.

In the present application, a product type may be understood as a line of business at a company, and a pricing segment may refer to a service or product (e.g. a unique service or product) offered to customers or consumers. Each pricing segment may have a unique combination of pricing parameters, funding variables, and profitability values. For example, in the context of financial services, a pricing segment could be any loan or certificate of deposit (CD) characterized or identified by a unique set of attributes. In this context, attributes are criteria that could impact the rate of a pricing segment, such as the credit score of a consumer or the term of a certificate of deposit. Each attribute of a pricing segment could have applicable attribute values or applicable value ranges. In a specific example, a first attribute is a credit score with a value range of 700 to 720, a second attribute is a term of one year, and a third attribute is a combined loan to value (CLTV) between 65 and 80. Thus, the pricing segment can be identified by a combination or a set of attribute values. In addition to the attributes, there may be multiple variables (e.g. optimization variables) that can be associated with a given pricing segment. Continuing the example, the pricing segment with credit score of 700 to 720, term of one year, and CLTV of 65 to 80 might have variables with the following current values: an interest rate of 3.25%, an introductory rate for the first twelve months of 2.5%, and an annual fee of 500 dollars. Economic modeling and price optimization may deal with multiple variables to realistically consider the impact of variations in those variables on KPIs.

In the context of the present application, current values (e.g. current variable values) can be distinguished from optimal (variable) values. Current values may correspond to values presently being used in practice, e.g. in product offerings. In contrast, optimal values may be the values required to maximize the value of a particular KPI. Thus, optimal values may differ for each KPI.

An optimization event considers a particular subset of pricing segments in a given time period and predicts current and optimized KPIs of the subset using economic models and price optimization methods. An optimization event may be understood as a "what if" scenario. Current KPIs may be calculated using current values, whereas optimized KPIs may be calculated using optimized values.

Goal management may refer to a situation where two (possibly conflicting) KPIs of a company are combined to create an effective objective for an event (e.g. an optimization event). The goal management axes describe the two KPIs (also referred to as business goals) that have been selected. For example, the two KPIs could be originations volume and net present value (NPV).

An opportunity curve may be understood as an efficient frontier curve, such that for all selected pricing segments in an event (e.g. an optimization event), the opportunity curve provides the optimum values of the two KPIs in the effective objective. Each point on the opportunity curve may represent a different scenario that defines a tradeoff between the two KPIs. For example, from a business point of view, profit and volume of customer transactions may be tradeoff characteristics. With an increase in profit (e.g. a profit for each transaction), the volume of customer transactions may decrease. In contrast, in order to get more customers, the business may need to accept a lower profit.

In general, an efficient frontier curve connects all the possible optimization scenarios that could be achieved by maximizing the two objectives during goal management, subject to the specified business rules. It is also known as an opportunity curve or Pareto-optimal curve. Pareto-optimality is also defined as the curve or boundary above which increasing one objective will necessarily decrease another associated objective.

A rate sheet may refer to a list of all pricing segments including current, optimal, and user values for variables (e.g. optimization variables). In some cases, a cell in the rate sheet defines a single variable.

An optimization scenario may be understood as a single combination of optimal prices for all services or products in a portfolio, determined based on a user selected optimal point on the opportunity curve. In this context, the prices may be understood as variable values.

A deal scenario may refer to negotiation points close to the optimization scenario that vary variable values (e.g. individual pricing segment variable values) from an optimal value to a negotiated value in order to facilitate determination of the effect of the variations on KPIs, and the probability of a future system operation in view of the variable values. The future system operation may be a customer transaction, e.g. agreeing on an adjustable rate mortgage.

FIG. 1 depicts a process of economic modeling, optimization, and negotiation separated into four phases. In a data loading and operation phase 101, the historical data set (e.g. a historical sales data set) may be loaded into data import tables 102 of a database. The historical data set may include raw information from a company—including transactional data (products that were newly bought, renewed, closed, etc.), and rate history data (for company prices, competitor prices, and other macroeconomic indicators). Obtaining the historical data set may include gathering client data and external data, where external data includes competitor information, and macroeconomic indicators. Obtaining the historical data set may also include validating the historical data set before loading the data into the database. The historical sales data set may be used for understanding demand trends in an industry.

In a modeling phase 103, the historical data set (data that was imported, validated and normalized in the data loading and operation phase 101) may be prepared for economic modeling using appropriate aggregation techniques and clustering algorithms. In some cases, modeling and seasonality hierarchies may be created and these hierarchies may be used as a basis for the aggregation and clustering of the historical data set. The aggregating and clustering of the historical data set may facilitate handling multiple scenarios including seasonality and cannibalization. The historical data set may also include transaction data. In addition to preparing the historical data for modeling, initial Bayesian prior information (e.g. pricing sensitivity estimates) may be loaded into the database (e.g. the Bayesian prior information may be loaded into Modeler Tables).

Clustering and aggregating of historical data may involve combining pricing segments or products into modeling products, based on similarities in transaction and volume trends. Each modeling product has its own base demand, and elasticity. Several modeling products could be combined into demand groups, and modeling parameters such as cannibalization factors can be calculated at the demand group level. One example of clustering of transactional data includes the determination of Pearson's correlation coefficients between any two pricing segments—a strong positive correlation along with similar volume ranges indicates similar trends that indicate pricing segments that could be combined into modeling products. Once this hierarchy is determined, the transactional data is aggregated at the modeling product level for summation of counts, and volumes of transactions and average variable values. Similarly, a strong negative correlation would indicate situations where cannibalization exists between pricing segments, e.g. a decrease in the number of short term personal loans might be related to an increase in home equity lines of credit.

Pre-modeling may used to describe operations performed on the historical data set before processing the data through a mathematical expression. Modeler tables 104 may contain data that is more time series specific and organized for usage by the appropriate demand models. For example, an origination demand model could aggregate the count and volume of transactions with a NEW state for each time period along with the rate information. In addition, the modeler tables 104 could also contain output from the modeler, including estimated likelihood parameters (elasticities, cannibalization factors, etc,).

The historical data set (also referred to as input data) may be processed through the mathematical expression, which represents either expected or current behavior of a system to be modeled. The current behavior of the system may reflect how the system is operating under real conditions. The system may be a technical system. For example, the system may be a computer system and the demand model may be used to estimate the resource use of the computer system. The mathematical expression may also be referred to as a function, such as a linear function, a nonlinear function, a nonlinear modeling function or a probability function. The mathematical expression may be formulated or derived using principles of probability and statistics. In particular, the mathematical expression may be formulated by analyzing historical data set and outcomes corresponding to the historical data set in order to achieve a best fit of the expected behavior of the system to other sets of data, both in terms of forecasting and fitting. Data processed through the mathematical expression may be referred to as output values. Outcomes corresponding to the historical data set may be KPI values derived using the historical data set.

According to a specific example, the mathematical expression (e.g. the nonlinear modeling function) is dependent on a particular product types, and science model. The historical data set is used to calculate values of a likelihood function, where the likelihood function quantifies the difference between the historical data and the calculated values from the mathematical expression; the modeler uses optimization algorithms, such as Newton-Raphson and gradient search techniques, to estimate modeler parameters in the mathematical expression.

Modeling (e.g. demand modeling) may be used to estimate pricing sensitivity of consumer demand to changes in variable values, including values of variables describing the client's products (e.g. rates, rewards, and fees), and competitor products, as well as variables whose values are governed by macroeconomic indicators. In this context, variables may also be referred to as regressors. Modeling may also provide information about time dependent parameters such as seasonal changes, and about cannibalization effects among different products. The variables and time dependent parameters (the time dependent parameters may also be referred to as variables) can be used to define a mathematical model of the system which predicts with a high degree of certainty how the system being modeled (e.g. the technical system or a financial system) will behave with different sets of data and assumptions. Cannibalization may refer to how changes in one product affect the KPIs of another product.

In general, an economic model can be viewed as a mathematical expression or representation, driven by a given set of input data and assumptions. The input data can be processed through the mathematical expression representing either the expected or current behavior of a real system. In some cases, the mathematical expression may be a nonlinear function. Modeling can be used in financial services as part of the process of setting pricing components of financial contracts such as interest rates, applicable fees, durations, penalties, balances, etc. Setting pricing components can be used by financial institutions to determine granular characteristics of underlying portfolio performance. Demand models can be used to create parameters for short to medium range planning and optimization of pricing practices on a portfolio segment level, and to generate portfolio performance analysis forecasts.

Modeling can be used to perform price optimization and for deal decision support. In particular, modeling may assist with understanding customers and how their buying patterns and utilization of services respond to multiple pricing levels and changes. Through modeling, particularly demand modeling, it may be possible to better understand demand elasticities and provide business users with valuable insight into portfolio performance processes such as customer retention, product selection and cannibalization, competitor impacts, and time variations in demand. Understanding customer behavior may enable price optimizations that maximize profit contributions at the targeted portfolio with balanced risk exposure.

Modeling engines, such as demand modeling engines, can be used to identify and quantify relationships between KPIs (such as number of customers, originations) volumes, utilization, retention, etc.) and external econometric valuables (e.g. rates, margins, competitors, incentives, and various marketing indices). Demand modeling may be understood as a core component in pricing analytics. Demand may be understood as the result of individual buying decisions on the part of potential customers. Each potential customer is subjected to the current economy and exposed to a multitude of variables (e.g. pricing variables) in the process of making a decision regarding whether to buy a company's product. Those who do not choose the company's product may purchase from the competition, or they might not buy anything. The output values of the mathematical expression of the demand model specifies how many more of these potential customers would buy if the company lowered its price and how many potential buyers would reject the offer if the company raised its price. Therefore, the mathematical expression of the demand model represent and is based upon customer behavior.

Input to the model may be provided in the form of the historical data set and variables. Modeling (e.g. demand modeling) can be described as a Bayesian estimation process that identifies model parameters such that the probability of observing the historical data set given the model parameters is maximized. The mathematical expression or function used to process the historical data set includes mathematical representations that would be most likely to generate the historical data set. The mathematical expression of the model may be implemented as at least one nonlinear function. The nonlinear function may be solved using an iterative solution. A modeler (i.e. a modeling tool) may employ a number of methods for finding solutions to nonlinear equations. For example, the modeler may employ Newton-Raphson and/or Gradient search techniques. These methods involve iterative steps, each a refinement of an estimate generated using modeling parameters, where the steps are carried out until a convergence criterion is met.

The maximum likelihood method is a numerical method that can be used to determine the best fit of a mathematical expression to a data sample, e.g. the historical data set. In other words, the maximum likelihood method can be used to determine the most appropriate mathematical expression to use for a particular historical data set. The maximum likelihood uses a probability formulation to find the most probable set of likelihood parameters (also referred to as likelihood variables) that can be inferred from the data.

According to one example, the likelihood variables estimated by the maximum likelihood method include time dependent parameters (such as seasonality effects by week or month for example), and non-time dependent parameters (such as elasticity—also called as beta—of each individual product, and cannibalization—also known as psi—between multiple products in a set). The likelihood variables can be distinguished pricing variables used to define a product or pricing segment such as interest rate, annual fee of an example financial product. During demand modeling, the current variable values and their effect on demand is used to estimate the modeler parameters. Then, the likelihood variables and pricing variables that best represent the past behavior are used to define the mathematical expressions (e.g. the nonlinear modeling function)—and are used during optimization and customer centric deal negotiation.

The maximum likelihood method can be used to develop solver engines that utilize the framework of a nonlinear regression to optimize the mathematical expression of the model. Modeling may utilize a number of functional forms including a utility function, a response function, a multinomial logit function, and unobserved component model (UCM) techniques.

In the equations (i.e. functions) listed below, the same term appearing in multiple equations has the same meaning in each equation, unless otherwise stated.

A utility function can be constructed as an inner product of a vector of variables and a vector of corresponding modeling parameters. In some cases, the variables of the vector of variables may be independent variables, also referred to as predictors or regressors. An independent variable may be understood as the variable that is manipulated or selected by an experimenter in order to determine its relationship to an observed phenomenon (i.e. the dependent variable). The statistical tests may be performed in order to verify the applicability and statistical validity of the variables.

The utility function may be represented as follows:

$$u(t) = \sum_k \beta_k x_k(t) \quad (1)$$

where u(t) denotes the value of the utility function at time t, $x_k$ denotes a set of independent variables with k=1, 2, 3, . . . ; and $\beta_k$ denotes a set of corresponding parameters for each independent variable. In other words, $\beta_k$ is a vector of modeling parameters, and $x_k$ is a vector of independent variables at time t.

Independent variables in a modeling framework may include external pricing variables such as rate and/or margin of financial institutions and competitors, discounts and incentives, external econometric indices such as Treasury Rate, Federal Rate, or Consumer Confidence Index, etc. Independent variables may also include an indication of a special event (such as a promotion, a holiday, a tax day, etc.), and seasonal weights. When a variable is a continuous in time index, it enters the utility function through the sensitivity parameter $\beta$. When a variable is an indication of a special event, it enters utility function as lift associated with that special event, e.g. promotional lift, in this case the variable may be a Kronecker function of a special event in time and the lift is sensitivity. When a variable in the vector of variables is seasonality (in general a time variant parameter), it enters the utility function either as an externally estimated time series or is modeled simultaneously with sensitivity parameters, for example by the methods of state space models and their extensions. The utility function may be a linear function.

The utility function may be used to construct a nonlinear function. Variables described in conjunction with the utility function may also be used in nonlinear functions based on the utility function. The following nonlinear response function can be used in nonlinear regression:

$$\mu(t) = \text{Exp}\left(\sum_k \beta_k x_k(t)\right) \quad (2)$$

where $\mu(t)$ denotes the value of the response function at time t.

A response function in the above form (e.g. a response function based on the function above) may enable modeling of the systems response to change in a variable (e.g. an independent variable). For example, a change in the rate will induce a change in the number of loan originations, which can be described by the following equation:

$$N(t) = \text{Exp}\left(\sum_k \beta_k x_k(t)\right) \quad (3)$$

Here N(t) denotes the number of loan originations at time t and the vector of Betas $\beta_k$ describes the sensitivity of the number of arranged loan originations to the rate changes.

A more complicated response function may account for affinity and/or cannibalization between different product segments (i.e. portfolios segments), or between a client's products and a competitor's products (as in equation 4). Equation 4 may be understood to be derived from or based on equation 2. For example, a percentage of new contracts for a certain product or a comparison of the client's business to the total number of contracts originated at a certain location (a product's market share) may depend on client and competitor rates offered at that location, and can be described by the following response function:

$$\% \text{ MarketShare}(t) = \frac{\text{Exp}(\beta_{client} r_{client}(t))}{\text{Exp}(\beta_{comp} r_{comp}(t)) + \text{Exp}(\beta_{client} r_{client}(t))} \quad (4)$$

Here $\beta_{client}$ is the sensitivity of the number of new accounts to a change in the client's rate $r_{client}$, keeping the competitor's rate $r_{comp}$, constant. This type of response function enables the modeling of effects on changes in the client's rate on deal negotiation.

Modeling functions such as utility functions, response functions, multinomial logit functions, and UCM techniques may be understood to approximate one or more operations of a system. Output values may be calculated by processing a particular set of input values through a modeling function. The future system operation may be a transaction with a consumer such as the completion of a deal. Calculated output values may represent the impact of carrying out the operation on a KPI.

The response function may be extended to a multinomial logit function. The multinomial logit function enables quantitative modeling of consumer choice behavior when a consumer is exposed to multiple choices. The multinomial logit function may be represented as follows:

$$P_i(t) = \frac{\text{Exp}(\beta_i X_i(t))}{\sum_{j=1}^{N} \text{Exp}(\beta_j X_j(t))} \quad (5)$$

The user may choose from among the following:
a product being sold,
another product in a demand group including products related to the product being sold,
a competitor's product.

Equation (5) can be used to calculate a probability that any one of the above choices will be selected, where the selection is also referred to as an event. In equation (5), the probability of one event (i) happening among several options (j=1 to N) is computed as a ratio of a model for event-i specific originations versus a summation over all possible events. Moreover, equation (5) includes n alternatives that are distinct and can be weighed independently. The probability $P_i$ of choosing one over the others is defined by its weight relative to the alternatives at time t. In particular, the multinomial logit function allows more than two discrete outcomes and can be used to predict probabilities of the different possible outcomes of a categorically distributed dependent variable, given a set of independent variables.

Further modeling techniques include methods applied to the modeling of an econometric time series. According to the techniques disclosed in the present application, seasonal variations in demand may be modeled in order to separate rate induced changes in demand from seasonal ones. Seasonal variations in demand may be understood as changes in demand attributable to the time of year. The modeling of seasonal variations in demand may also be useful for providing reliable forecasts for a particular time of optimization. In modeling time varying processes according to a specific example, techniques and methods of unobserved components models (UCM) given through common state based representations of dynamic systems can be used. UCM techniques are similar to regression methods, with the major differences being in the presence of a serial correlation between close in time events (i.e. events that have a close chronological relationship).

A serial correlation can exist when the user choices (e.g. customer choices) at a particular point in time affect future choices. In many scenarios, users are reluctant to change products, (financial services such as CDs or money markets, for example) after their initial choice. For renewable products such as certificates of deposit, e.g. with a term of 3 months, the probability of renewal after 3 months is affected by the probability of the customer re-opening the original CD—along with changes in rates, etc.—in the time period. Such serial correlation in "close in time events" needs to be differenced out of the time series in order to calculate the exact effect of changing rates on customer decisions.

An example of a UCM technique is a scalar Gaussian autoregressive moving average (ARMA) (1,1) process, which can be represented as follows:

$$y_t - \mu_t = \phi(y_{t-1} - \mu_{t-1}) + \epsilon_t + \theta \epsilon_{t-1} \qquad (6)$$

wherein $y_t$ is a vector of independent variables and $$\mu_t = S_m(t) + S_w(t) + \kappa \frac{t - t_0}{T} + \sum_j \beta_j R_j(t) \qquad (7)$$

is a non stochastic sub-component of the process.

With regard to equations (6) and (7), a stochastic process is random in nature; and the non-stochastic sub-component (i.e., the non-random or deterministic part) of the process described by equation (6) is assumed to be dependent on the factors being considered in equation (7). Thus, in equation (7), $S_m$ is a monthly seasonal component, $S_w$ is a weekly seasonal component, and kappa $\kappa$ represents a linear trend; the final summation in equation (7) represents the effect of the variables and their elasticities/betas.

In addition, $\phi$ and $\theta$ are parameters of ARMA (1,1) and $\epsilon_t$ is Gaussian noise. In some cases, by following an iterative process defined for recursive filter algorithms, it is possible to simultaneously estimate parameters of the non-stochastic component (e.g. seasonality dummies, linear trend, sensitivities to external variables, etc.) and parameters of ARMA (1, 1) process by optimization of the appropriate likelihood function.

According to a specific example, the appropriate likelihood function calculates the sum of squares of the difference between actual values from the data and the calculated values from using the utility/response functions. Thus, the maximum likelihood that the demand model explains the results shown in the historical data set is achieved by optimization of the likelihood function, i.e. minimizing the sum of the squares of differences or errors.

Typically, numerical procedures for optimization require the derivatives of the log likelihood, where the log likelihood is the logarithm of the sum of the squared difference between historical data and a calculated value from the demand model. The derivatives of the log likelihood are calculated numerically in a separate seasonality method of a solver engine.

An event creation and optimization phase 105 deals with the creation of different scenarios that describe the development of list prices that support business codes (i.e. KPIs). Optimizer tables 106 could contain event specific information, such as KPIs being optimized, business rules set on the event, and optimal variable data sets. The list prices may be understood as a set of variables that need to be optimized in order to maximize or explicitly tradeoff between several KPIs. By using the economic model defined in the modeling phase 103, along with a detailed description of variables, key performance indicators, and additional rules or constraints at a business, multiple future systems operations can be modeled and then optimized.

In the event creation and optimization phase 105, forecasts and estimations of KPIs during an actual rate optimization process can be constructed out of appropriate functional forms and estimated modeling parameters. For example, the net present value (NPV) of a type of home equity line of credit (HELOC) originations predicted to be originated over a month of July will depend on a predicted number of originations (as a function derived from a defined functional form, for example the multinomial logit function), predicted utilization over the life of the account (as a function of the multinomial logit function), and on the predicted average life of the account (modeled through retention rates as a multinomial logit function). All of these processes can be modeled based on historical transactions or incorporated as external to solution models in order to construct a final expression of the NPV. This technique may also be applied to other KPIs.

A conventional approach involves setting rate sheets using a combination of cost plus pricing and an assessment of competitors. However, the conventional approach fails to consider price elasticity of consumer demand. Price optimization according to the present application addresses this shortcoming by developing optimized prices (i.e. optimized KPIs) for each future system operation (i.e. each event). The optimized prices can be developed from multiple variables (e.g. rates, rewards, and fees) at the same time. The optimization may be performed using nonlinear programming algorithms suitable for modifications and improvements that take unique problem features required in the financial services industry into account.

A deal decision support and reporting phase 107 includes the following components: a deal decision support (DDS) component, a deal scenarios component, a report engine, and an optimal/negotiated scenario engine. This system can support a user in determination of deal scenarios by varying optimal prices based on user input and providing different possible negotiated prices, showing the impact on KPIs, and the effect of the different prices on the probability of completing the deal. In particular, the DDS system can utilize predicted acceptance or rejection events of previous offers during negotiation to determine the best price to offer a customer. The DDS system provides an easy way for a first user (e.g. a front office employee of a company) to estimate the sensitivity of a second user (e.g. a customer) to changing prices, and the relative probability of a future system operation (e.g. that the second user will accept a deal), while also making sure that KPI requirements are enforced.

Completing the deal may be understood as a future system operation, and thus, a probability of completing the deal may be understood as a probability of the future system operation. In general, deal decision support is a short term or real time planning tool that provides knowledge to a first user (e.g. a service provider) during a deal negotiation with a second user (e.g. a customer). The deal decision support (DDS) tool may also describe an impact of pricing decisions on KPIs, and enable a user to achieve one or more objectives of a company. The usage of optimization models that encompass the mathematical expressions of the demand models along with business rules and thresholds placed on pricing variables and KPIs may facilitate the determination of minimum and maximum variable bounds during deal negotiation while accounting for cannibalization effects on other portfolio segments offered by the company. The system may optimize KPIs by varying a subset of variables (e.g. the pricing variables) and provide a range of deal scenarios that encompass all possible pricing variations. In addition, the impact of variable variations on the following may be determined: multiple KPIs, the objective function that signifies the overall market strategy of the company, the function defining the probability of successful completion of the deal.

Also, the accurate information provided by the demand and optimization models regarding the effect of a specific deal on KPIs may enable a decision to be made regarding the end value of the deal.

FIG. 2 shows an example of product segmentation. In general, a segmentation model defines a segment or product as a combination of attributes. For example, a product can be defined as a combination of a risk tier, a geographical region, a customer type, a product type, and a collateral type. In terms of product contribution to KPIs, products can be described in terms of observations such as "number of new originations", "average volume at origination", "retention" or "survival factor", "average life", etc. Statistical modeling can be applied to identify relationships between observations on the product level as functions of variables and components.

Figure 3:
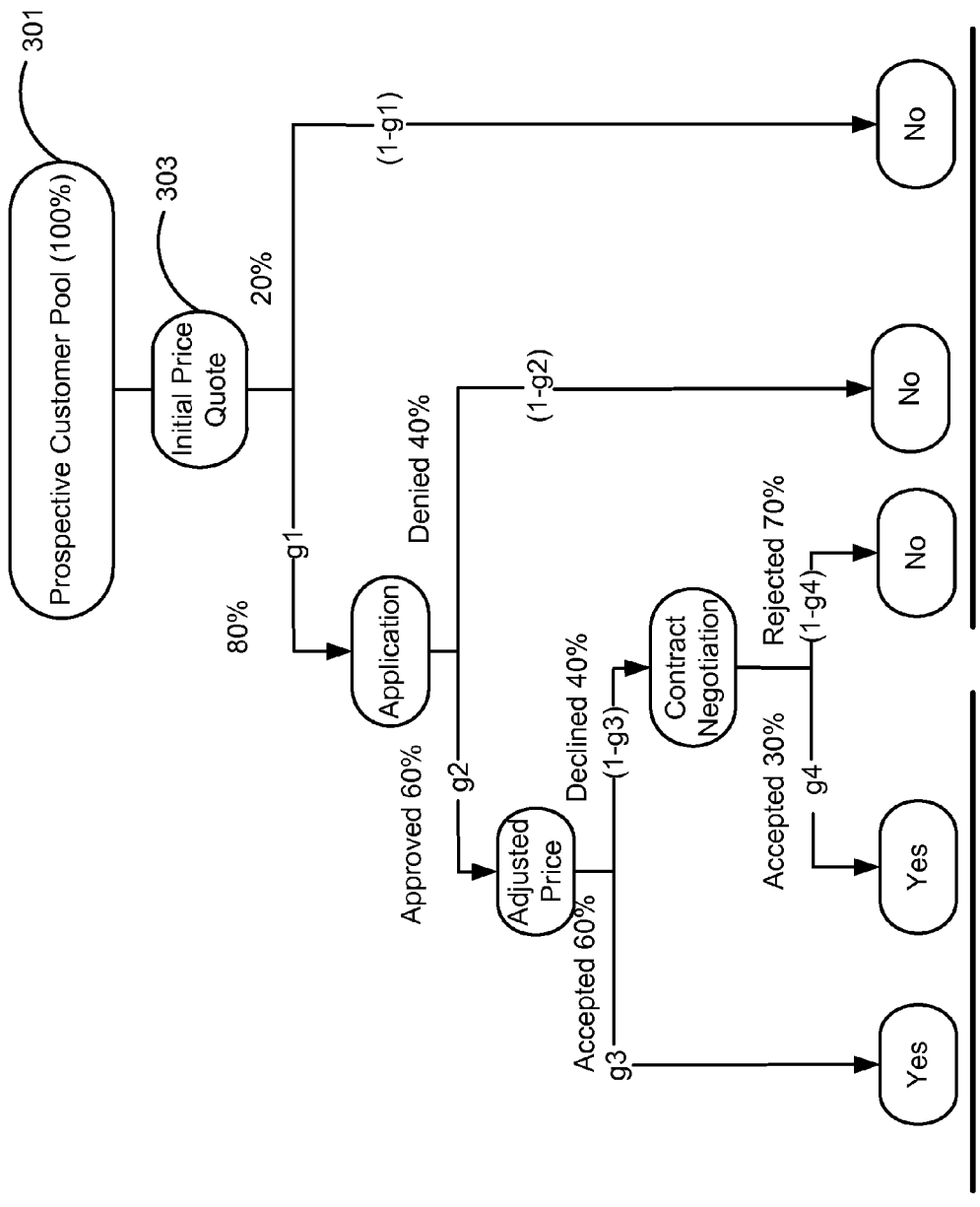
FIG. 3 depicts a process of negotiating a deal with a customer.

FIG. 3 depicts an exemplary negotiation process. In some cases, optimized prices determined using demand models are changed during actual deal negotiation with customers. From a perspective pool of customers for new originations 301, many of the customers are provided with an initial price quote 303 that is then adjusted and finally ends with a negotiated price during customer acceptance. Customer centric pricing tools may employ additional segmentation approaches to organize, automate, and synchronize back-end demand modeling based systems with front end customer facing business processes.

Customer relationship management (CRM) analytics and pricing can be used to find, attract, and win new customers, nurture and retain existing customers, and entice former customers back, all the while reducing the costs involved in the process. Segmentation models based on CRM attributes (as depicted in FIG. 2) may enable better profiling and targeting of customers. Econometric models can be used to handle acquisitions (new customers), renewals (former customer), and utilization (existing customers), improved determination of individual behavioral trends and elasticities, and finally, optimize KPIs with appropriate business rules and thresholds to enforce low costs and achieve high returns.

A model (e.g. a data model or more specifically, a base demand model) may be dependent on list rates (r), competitive rates (c), marketing and promotions (m), and external factors ($\zeta$). Any of the functional forms (i.e. modeling functions) for utility and response functions described with respect to FIG. 1 that handle seasonality and cannibalization factors along with demand modeling can be described with a general equation as follows:

$$Q_i = \Delta_i^Q(\vec{r}, \vec{c}, \vec{m}, \vec{\zeta}) \quad (8)$$

In order to estimate the accurate response from a customer for any given deal, demand modeling by itself could be employed. However, demand modeling by itself fails to handle deal negotiation (as the dynamics of the negotiation process involve multiple adjusted prices), and the final rates are not considered. A purely customer centric pricing process that does not use demand modeling could also be employed. However, such a process would also be insufficient. In particular, a purely customer centric pricing process could use a variety of algorithms that focus on auto-association networks and neural networks. In general, such algorithms work as follows:

receive customer data via a computer network and create a segment model;
try different prices with similar customer types;
store acceptance/rejection criteria;
improve the forecasting ability of the model by using the historical data set.

A learning network (i.e. an artificial neural network) can then forecast either acceptance of rejection from a new customer faced with a similar deal.

Unfortunately, using a purely customer centric pricing approach, though based on the learning network, fails to provide several features that are provided by a demand modeling based approach. The features may include the following:

Seasonality. The historical data set may have trends based on the date or time of the deal that may not be repeatable for a new customer.

Cannibalization. The current choices faced by the customer might be different, and might involve possible cannibalization situations among the different services provided by the same company.

Competitor information. A demand model can capture an effect of competing products or services from another company. Also, since a competitor can dynamically vary their prices, a deal negotiation or customer centric pricing system may allow for new competitive rates to be updated and used.

Macroeconomic conditions. The behavior of a customer with respect to a given deal can change completely based on economic conditions. For example, a deal provided on a certificate of deposit when the treasury bill rate is low might be useful compared to a similar deal offered when the treasury bill rate is higher.

When implemented as a customer centric demand model, the model may be dependent on list rates (r), final rates (s), competitive rates (c), marketing and promotions (m), and external factors ($\zeta$). The final rate (s) is the negotiated price that affects the probability of completing the deal.

A corresponding equation may be formulated as follows:

$$C_i = \Delta_i^C(\vec{r}, \vec{s}, \vec{c}, \vec{m}, \vec{\zeta}) \quad (9)$$

A demand modeling based customer centric pricing system may be used to estimate an accurate response from a customer for any given deal. The final number of customers is the product of the number of leads $\Delta_i^Q$ (modeled on list rates, competitive rates, marketing and promotions, and external effects) and the probability of winning the quote $\omega_i$. A corresponding equation may be formulated as follows:

$$C_i = \Delta_i^Q(\vec{r}, \vec{c}, \vec{m}, \vec{\zeta}) \cdot \omega_i(\vec{s}, \vec{c}) \quad (10)$$

Figure 5:
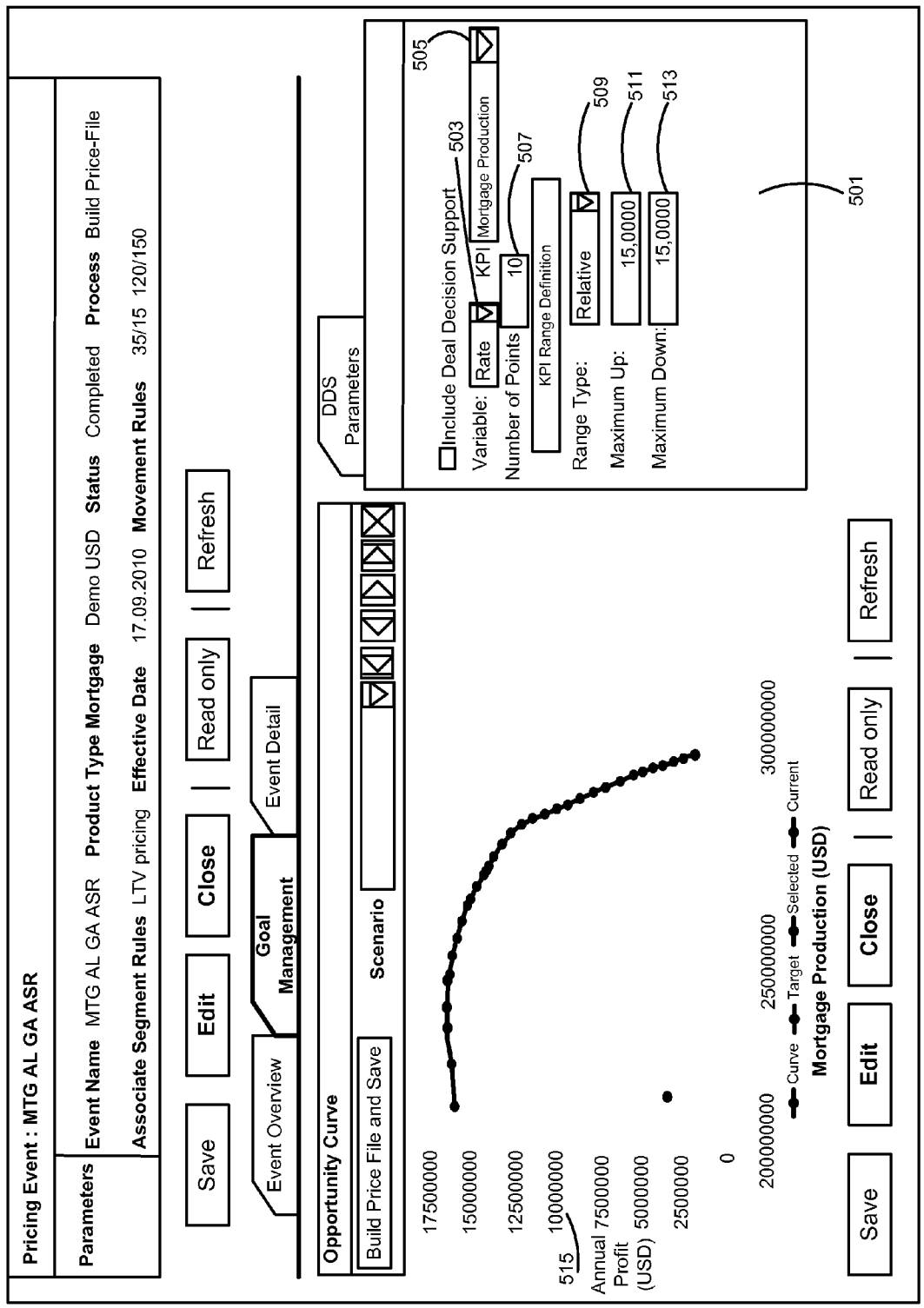
FIG. 5 depicts a user interface that enables identification of variables whose input values are to be varied and enables visualization output values resulting from processing the input values.
Figure 6:
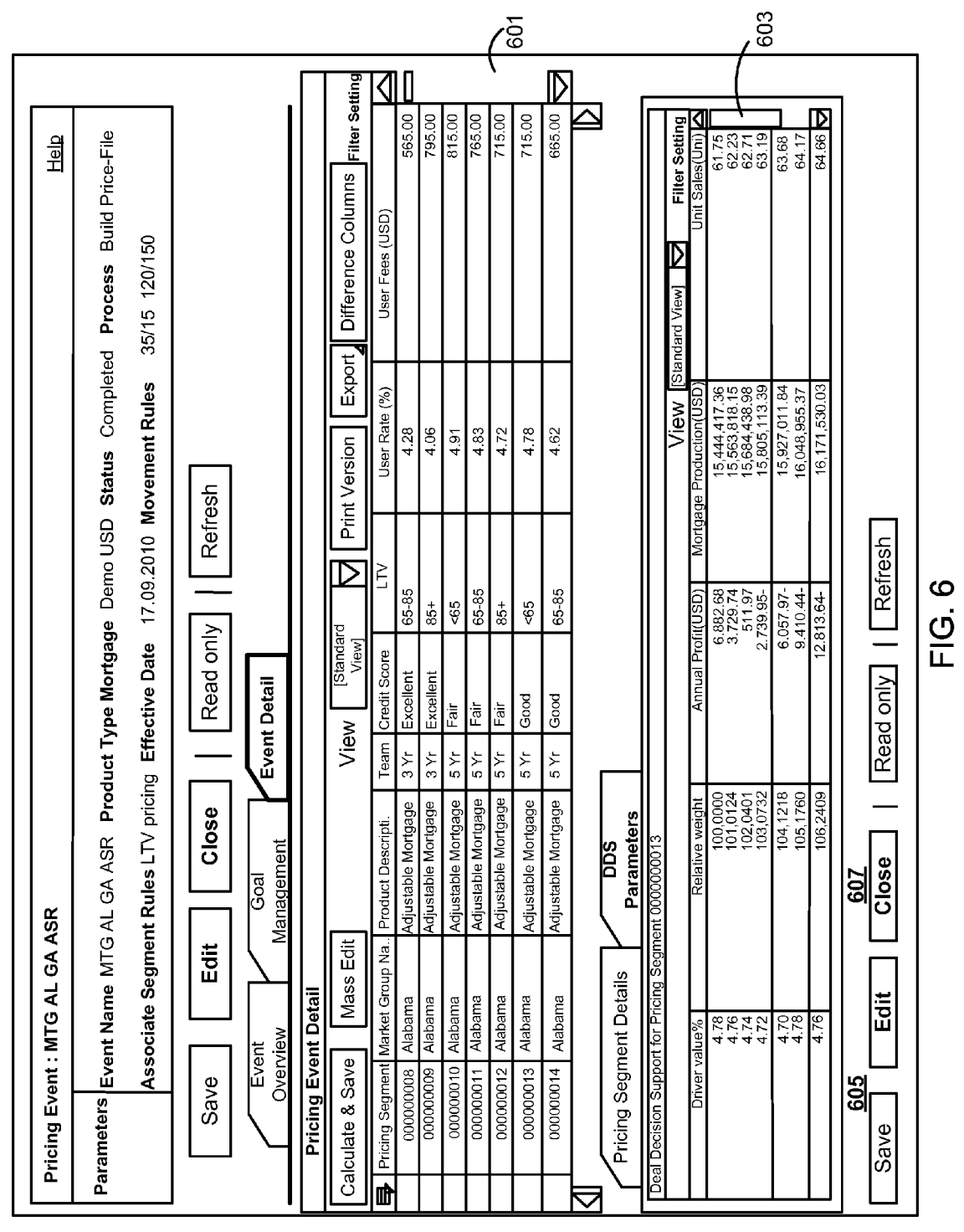

The probability of a future system operation (e.g. the probability of completing the deal) can be determined based on information provided by the demand model. The DDS system described with respect to FIGS. 4 to 6 illustrates a demand modeling based determination of the probability of the future system operation (i.e. closing the deal).

Equations (3) to (1) may be understood as nonlinear modeling functions.

FIG. 4 depicts a graphical user interface showing characteristics of a future system operation. In the specific example of FIG. 4, the future system operation is a pricing event for a mortgage service offering with predefined KPIs, business rules, and variables (e.g. optimization variables).

The graphical user interface (GUI) of FIG. 4 may be understood in the context of a DDS system. The DDS system may enable the user to negotiate a product origination, renewal, or utilization with a higher awareness of the impact of their decisions on KPIs. According to the example, the user may choose a variable (e.g. a pricing variable) to vary during the optimization process. The DDS system may then allow the user to examine the effect of the variation on one or more KPIs.

Before being displayed in the GUI of FIG. 4, characteristics of the pricing event may be defined. Defining the characteristics of the pricing event may be described as creating the "what-if" scenarios that can be performed in order to plan future product offerings that maximize key performance indicators. An economic model that uses pricing sensitivities of consumer demand to predict the future sales may be created with appropriate long-term and short-term goals of a company in mind. The process of defining the characteristics of a pricing event (i.e. pricing event creation) may involve describing the environments of a company, and mapping out an overall strategy that considers multiple (sometimes conflicting) goals of the company. The overall strategy may maximize the benefit to the company while considering different tradeoffs (if necessary). The pricing event creation process may be performed by the user.

One example of a specific pricing event (i.e. a "what-if" scenario) at a credit card company deals with multiple variables. For example, the variables might be a new rate offered, reward percentage points per transaction, and annual fee charged on account. The pricing event might also concern multiple goals of the company, i.e. key performance indicators, such as increase in volume or number of sales, increase in net profit, decrease in loss due to an expected probability of default, or increase in the risk adjusted return on assets. The pricing event may also consider additional business constraints, such as avoiding drastic changes in product pricing, maintaining customer segmentation effects on variables, and overcoming certain financial hurdles, etc.

The pricing event may include one or more of the following optimization factors: a product type for optimization, KPIs to use during optimization, variables (e.g. optimization variables), and constraints (possibly implemented as business rules). A product type defines a unique set of characteristics describing a product or service. In particular, the product type can be used to determine the demand models that can be used based on different requirements. For example, a CD has renewal properties and accordingly requires a demand model that handles renewals. On the other hand, a money market requires an origination model. In addition, macroeconomic indicators and/or competitors might be different based on the product type. For example, a treasury bill could be a valid macroeconomic indicator for deposits, whereas a home price index (HPI) might be a better macroeconomic indicator for a home equity loan.

An event total data sheet 401 depicts a number of KPI values. The values may be calculated as a sum of all KPI values for pricing segments included in the depicted pricing event. For example, in a first pricing segment, a mortgage service company might provide a 30 year loan for $100,000 with a current interest rate of around 5%. Based on a price elasticity predetermined by the modeler, current unit sales might be calculated as 1000 units at 5%. Based on portfolio optimization during event creation, considering all pricing segments within the pricing event, and the specific optimization scenario selected on the opportunity curve, the optimal unit sales for the same pricing segment might be 1200 units with a rate of 4.5%. Based on all the optimal rates within the event, the event total for "optimal" is calculated. The default may be implemented as a summation of pricing segment variable values; however, the user can configure the KPI calculation and aggregation using additional Business Add-Ins (BAdIs). Thus, in the example of FIG. 4, event total optimal unit sales 405 could be calculated by adding the optimal unit sales for first pricing segment to optimal unit sales for all other pricing segments in the pricing event.

A user column 403 shows the event totals after user overrides of the optimal values have been performed (e.g. after the user has changed the optimal values in order to improve the probability of closing the deal). For example, the user might decide that rather than reducing the rate value suddenly by 50 basis points, he/she could implement a user rate of 4.75% with estimated "user" unit sales of 1050 units. An optimal-current column 407 displays the difference between the optimal value (e.g., the optimal unit sales 405) and the current value (from current column 409). User-optimal column 411 shows the user value minus the optimal value. For example, after the user overrides the optimal rates, the expected user volume might be lower than the forecasted optimal volume.

One simple example of KPI calculation for a single pricing segment follows:

$\beta$: sensitivity,
tdd: time dependent demand,
q0: base demand,
Mortgage production: volume for pricing segment.
1) Data available: $\beta=0.5$, tdd=1, q0=5, current rate=2.0%, Average volume of loan=$50,000, Cost of funds=1.0%;
2) Unit sales=tdd*exp(q0+$\beta$*rate)=1*exp(5+0.5*2) =403.42;
3) Mortgage production=unit sales*average volume=403.42*50000=$20.171 M;
4) Unit profit=(rate−cost of funds)*average volume=1%*50,000=$500;
5) Total profit=unit profit*unit sales=$2,017.14 K;
6) The event totals are aggregated for all pricing segments in the pricing event (possibly by summation).

Different KPIs may be defined for each product type. In addition, the same KPIs may be used for a multiple product types. For example, a credit card may include an expected last KPI that calculates the loss for the company due to the probability of default associated with customers with different credit scores. In some cases, multiple KPIs may be defined for each product type. Exemplary KPIs include net income after taxes, risk adjusted return on capital, net interest spread, cost to serve, customer satisfaction, etc. Moreover, default KPIs may be used for all product types. Default KPIs may include profit, volume, and a number of originations. Other default KPIs or other KPIs specific to a product type are also possible. Unit sales, number of originations, and other KPIs may be determined using economic modeling functions described in the present application.

Variables, also referred to as pricing variables or optimization variables, may be based on the product type. In addition, within a product type, the user could select different subsets of variables in order to determine the effect of multiple system operations. These system operations may also be referred to as potential future system operations, customer/competitor transactions, events, pricing events, or "what-if" scenarios. For example, the user could check multiple KPIs (e.g. optimized profit and volume) when one or more of the following variables are varied: rate, reward, and fee. The user can also simulate another future system operation where only the rate and fee are varied, keeping the reward percentage points constant. Comparison of an event where all three variables are varied and an event where only two variables are varied may provide an improved man-machine interaction and assist the user in understanding the effect of certain future system operations, or more specifically, the importance of the reward variable and its effect on KPIs. In particular, various values of the rate, reward, and fee variables may be used in one or more nonlinear functions. The output values of the nonlinear functions may be used to determine one or more effects of the system operations approximated or simulated by the nonlinear functions, e.g. effects on KPIs.

One aspect of creating future system operations to be simulated is to model constraints faced by users. Constraints placed on future system operations can be used to create optimized output values and produce incremental changes in the output values with respect to current values. In some cases, current values refer to values presently being used in the company's products. The user can then plan a sequence of incremental changes, and determine the effect of those changes on multiple KPIs without needing to resort to drastic changes.

FIG. 5 shows a user interface that facilitates the choice of a variable to vary when managing operations of a system. Varying the variable may also be understood as replacing the variable with one or more input values in order to calculate output values of the function to which the variable corresponds. The GUI also enables a user to examine the effect of the variation, e.g. the effect on a defined KPI. Managing system operations may include an optimization process and a negotiation process. In the negotiation process (as described with respect to FIG. 3), there may be a limit on the maximum possible variation of a KPI from an optimal value. The graphical user interface depicted in FIG. 5 includes a DDS parameters screen 501. The DDS parameter screen 501 may include fields enabling the entry of the following information:

a variable field 503 can be used to select a variable to be varied during the negotiation process;

a KPI field 505 can be used to select the KPI for which an allowed range is defined for simulating a future system operation;

a number of points field 507 can be used to specify the number of future operations (e.g. deal scenarios) to determine on each side of an optimal value (e.g. an optimal price);

a KPI range definition can be used to set thresholds for the future system operation. The KPI range definition depicted in FIG. 5 includes a range type field 509, a maximum up field 511, and a maximum down field 513; these fields may be defined as follows:

the range type field 509 can be used to select whether absolute or relative values are used to calculate the range of the KPIs selected in the KPI field 505;

when the selected range type is "relative", a value entered in the maximum up field 511 is a percentage of a current KPI value. If the range type is "absolute", the value entered in the maximum up field 511 can be provided in the units of the KPI (e.g. dollars, number of products, or a percentage);

if the range type is "relative", the value entered in the maximum down field 513 may be a percentage of the value of the KPI selected in the KPI field 505. If the range type is "absolute", the value entered in the maximum down field 513 can be provided in the units of the KPI (e.g. dollars, number of products, or a percentage).

In the example of FIG. 5, the KPI of "mortgage production" has been selected in the KPI field 505. The values in the maximum up field 511 and the maximum down field 513 define the KPI range to be plus or minus 15% from the optimal KPI value. The value in the number of points field 507 indicates that the number of future system operations to simulate is 10. The variable field 503 indicates that the subset of variables to be varied consists of the variable "rate".

The GUI depicted in FIGS. 4 to 6 provides the user with a way to specify KPIs and define objective functions (e.g. nonlinear functions); the GUI also enables the user to model functional forms, parameters, optimization variables, constraints (e.g. business rules), and threshold ranges for optimization variables and KPIs, e.g. for use during the negotiation. The computer system of the present application provides techniques to efficiently optimize KPIs by varying an appropriate subset of variables, and provides a range of future system operations (e.g. deal scenarios) that relate input values defining pricing decisions to the effect of input values, e.g. the effect on KPIs. The computer system of the present application also provides functions that enable the probability of a future system operation to be determined (e.g. the probability of success in completing a deal). Furthermore, the computer system of the present application operates within and supports existing work flow functions such as planning, reporting, reviewing, and approving steps for deal negotiation.

Future operations (e.g. deal scenarios) can be determined based on the DDS parameters provided by the user. The determination can be performed by a DDS engine using the following steps:

Convert the boundaries provided in the maximum up field 511 and the maximum down field 513 into appropriate variable value boundaries. The lowest and highest variable values that result in the maximum up and maximum down values may be calculated by evaluating the entire portfolio of products and services in order to ensure that cannibalization and other factors used in the utility and response functions are considered. —Based on the value provided in the number of points field 507, a number of evenly spaced variable values can be determined between the optimal value of the variable and the minimum/maximum variable values.

For each future system operation to be simulated, the probability of the future system operation may be calculated, e.g. the probability of winning the deal. The probability function may be one of the economic modeling functions described with respect to FIG. 1. In particular, the probability function may be based on a linear function (e.g. a utility function) or a nonlinear function (e.g. a response function) defined with regard to FIG. 1. According to one example, the probability function may be an extension of equation (3), as follows:

$$P_{rel}=\mathrm{Exp}(\beta_i(X_i(\mathrm{DDS})-X_i(\mathrm{Opt})) \qquad (11)$$

In the probability function above (equation 11), $P_{rel}$ is the relative probability, $\beta_i$ is the sensitivity of the input variable, and $X_i(\mathrm{DDS})$ and $X_i(\mathrm{Opt})$ are the values of the input variable at the DDS point and the optimal point, respectively. The DDS point (i.e. the point being evaluated) may be understood as one of the points defined in the number of points field 507 and displayed in a curve on a graph 515.

Other probability functions can include first and higher order extensions of the demand functional forms around optimal values. For example, the following probability function is based on equation (5):

$$P_{rel}=P_i(X_i(\mathrm{DDS}))-P_i(X_i(\mathrm{Opt})) \qquad (12)$$

where $P_i$ is determined using the logit functional form of equation (5) and $X_i(t)$ has been replaced with the $X_i(\mathrm{DDS})$ and $X_i(\mathrm{Opt})$ respectively, i.e., the DDS variable value, and the optimal variable value. In addition, the $P_{rel}$ value has to be normalized (divided by $P_i(X_i(\mathrm{Opt}))$ for example) in order to obtain a result in the range of 0 to 100 and above. A relative probability of 104 might indicate 4% higher probability of a deal with the $X_i(DDS)$ value compared to the $X_i(Opt)$ value.

Values of the input variable at the optimal point, i.e. $X_i(Opt)$, are the same optimal values determined during optimization of the pricing events. $X_i(Opt)$ are the optimal variable values that maximize the objective functions selected by the user as part of the goal management/efficient frontier curve; and depend on the optimization scenario that has been chosen on the curve.

Computation of the future system operation depends on whether relative or absolute has been selected in the range type field 509. If relative has been specified, then the probability of the future system operation can be determined as follows. "V" refers to the variable selected in the variable field 503, and KPI refers to the KPI selected in the KPI field 505. f(V) is the value of the KPI. $B_{up}$ refers to the value entered in the maximum up field 511 and $B_{down}$ refers to the value entered in the maximum down field 513. The subscript "c" refers to the current point. The current point may be understood to refer to KPI values and variable values associated with a point on the graph 515. The subscript "o" refers to an optimal point. The optimal point may be understood to refer to optimal KPI values and the variable values used to calculate the optimal KPI values. The subscript "min" refers to a lower bound and the subscript "max" refers to an upper bound.

By maximizing and minimizing the variable value in the optimization model of equation (13), subject to the constraints set on the KPI boundaries, the $V_{up}$ and $V_{down}$ values can be determined. In cases where the KPI function can be approximated with a linear function, the approach described with respect to a linear probability function (see below) could be used.

Business Add-Ins (BAdIs), e.g. SAP business add-ins, are defined based on customer specific requirements of their product types and market environments. For example, a typical rule for rates could be that they cannot be negative. So, when the rate for a particular pricing segment is 0.25, and the customer creates a movement type business rule of 50 bps, the calculated minimum is −0.25 (negative 0.25), and the calculated maximum is 0.75. In the BAdI, it is possible to set a constraint that the requirement of non-negative rates is maintained by modifying the minimum to zero, or a minimum floor value (say 0.05) before the optimization. Other requirements that could be considered with the initial price BAdI include ensuring non-negative profit and zero movement on discontinued grandfathered products (no change from current values).

Accordingly, the following definitions may be used in the computation:

$V_{up}$ is the maximum variable value allowed by the initial price Business AddIns (BAdI), relative to the optimal variable value;

$V_{down}$ is the minimum variable value allowed by the initial price Business AddIns (BAdI), relative to the optimal variable value;

$KPI_c = f(V_c)$;

$KPI_O = f(V_o)$; where "V" represents promotional lift in sales due to specific promotions that have been offered to the customer. The calculations for $f(V_c)$ and $f(V_o)$ differ only in the values taken by the variables—the current rates versus the optimal rates;

Possible KPIs that could be described by $f(V_c)$ and $f(V_o)$ include unit sales, volume and profit. Thus, unit sales=tdd*exp(q0+β1*rate1+β2*rate2* . . . β16*rate16+V);

volume=average volume per unit*unit sales;

profit=(rate−cost of funds)*average volume per unit*unit sales;

where tdd is time dependent demand, q0 is base demand, and β is sensitivity;

If $KPI_c == KPI_o$, then there are no DDS values for this segment and processing is complete;

$KPI_{max} = KPI_o + B_{up} * |KPI_c - KPI_o|$;

$KPI_{min} = KPI_o - B_{down} * |KPI_c - KPI_o|$;

$V_{up}$ is the maximum value of V such that $V_{up} <= V_{max}$, and $KPI_{min} <= f(V_{up}) <= KPI_{max}$;

$V_{down}$ is the minimum value of V such that $V_{min} <= V_{down}$, and $KPI_{min} <= f(V_{down}) <= KPI_{max}$.

In the last two cases ($V_{up}$ and $V_{down}$), all the inequalities are needed because the selected KPI could either go up or down when the variable V goes up. If absolute is selected in the range type field 509, all of the formulas above are the same except for the following:

$KPI_{max} = KPI_o + B_{up}$;

$KPI_{min} = KPI_o - B_{down}$.

In the case of a relative or absolute range type, once the upper and lower bounds of the variable V are known, $N_{up}$ evenly spaced points are created between $V_O$ and $V_{up}$, and $N_{down}$ evenly spaced points are created between $V_O$ and $V_{down}$. Here N is the number of points entered in the number of points field 507.

The following is a specific example of the determination of the probability of a future system operation using a linear probability function. According to the example, the range type is relative, the variable is rate, the KPI is profit, $B_{up}=20$, and $B_{down}=20$. According to the example, the following variable values are used:

$V_c = 5\%$
$V_o = 5.5\%$
$V_{max} = 6.0\%$
$V_{min} = 5.0\%$
$KPI_c = \$550$
$KPI_o = \$600$ Then, assuming a linear KPI function (i.e. a linear profit function):

$KPI_{max} = 550 + B_{up} * |KPI_c - KPI_o| = 0.2 * |550 - 600| = \$560$;
$KPI_{min} = 550 - B_{down} * |KPI_c - KPI_o| = 0.2 * |550 - 600| = \$540$;

$V_{up}$ is the maximum value of V such that $V_{up} <= 6\%$, and $540 <= f(V_{up}) <= 560$, the upper KPI bound constrains the value of $V_{up}$ such that $V_{up} = 5.6\%$;

$V_{down}$ = minimum value of V such that $4.5\% <= V_{down}$, and $540 <= f(V_{down}) <= 560$, the lower KPI bound constrains the value of $V_{down}$, such that $V_{down} = 5.4\%$.

where $N_{up} = 10$ and $N_{down} = 10$, the probability function would have the following input values (i.e. DDS values): 5.4, 5.41, 5.42 . . . 5.49, 5.5, 5.51, . . . 5.6%. Since the range type is relative, all values are percentages. In the alternative case, where absolute was selected in the range type field 509, but all the other parameters were the same, the difference would be that $KPI_{max} = 550 + 20 = 570$, and $KPI_{min} = 550 - 20 = 530$. $V_{up}$ would 5.7%, and $V_{down}$ would be 5.3%. The output of the probability function would be computed using input values of 5.3, 5.32, 5.34, . . . 5.48, 5.5, 5.52 . . . 5.7%.

When the function approximating or simulating one or more operations of the system is nonlinear, the calculations shown above (assuming a linear KPI function) are not valid. Nonlinear KPI functions include Net Present Value (NPV), Risk Adjusted Return on Capital (RAROC), and unit profit calculations that are based on the age of a loan. In general, when there is a strong cannibalization effect on the modeling function of one product from other products or services in the portfolio, changing the variable value for one product function affects the functions modeling other products, so that there is a nonlinear effect resulting from the variable value variation. Though the variation of output values (e.g. KPI values) close to the optimal variable value can be approximated to a linear value, better accuracy can be achieved when the computer system provides a nonlinear optimization methodology to compute the exact variable balance by taking into consideration the complete nonlinear response functions defined for demand modeling.

The minimum and maximum variable balance for each of the products and services in the portfolio can be determined using the following DDS optimization model:

$$\text{maximize/minimize } v_i \quad (13)$$
$$\text{subject to } l \leq v \leq u$$
$$a.v \leq b$$
$$g(v) \leq 0$$
$$KPI_{min} \leq f(v) \leq KPI_{max}$$

In the DDS optimization model of equation (13), the values of the variables (v) have lower bound (l) and upper bound (u) based on movement rules, linear constraints based on business rules, nonlinear constraints based on portfolio level rules and the bounds set on the KPI in a DDS parameter screen 501. The variables (v) represent independent variables, as used in equations (2) to (10). The DDS optimization model of equation (13) can be used with nonlinear KPI functions. For example, equation (13) can be used to determine the variable bounds ($V_{up}$ and $V_{down}$ mentioned above), the minimum and maximum variable values (given the nonlinear nature of the KPI functions), and the user provided boundaries on KPI values. When a KPI function is nonlinear in the range of variable values possible (according to the values entered in the maximum up field 511 and the maximum down field 513), the DDS parameter can be updated in an additional BAdI, and then the nonlinear DDS optimization model above (equation 13) can be used to determine the lower and upper boundaries of variable values.

In some embodiments, Lagrange relaxation of constraints is used to convert the constrained model of equation 13 into a bounded unconstrained model by moving the constraints into the objective function. The penalty values set on the constraints in the objective function can be chosen as single values (the same for all constraints) or constraint-specific values using an optimization parameter BAdI. Augment Lagrangian functions in the objective function can be used to ensure that the unconstrained optimization algorithms being utilized provide a feasible solution to the original constrained model.

In the DDS optimization model of equation (13), movement rules are defined as follows:
  bounds of the variable values (l<=v<=u),
  linear constraints, such as associated segment rules and associated variable rules, defined using a.v<=b (where a and b are vectors),
  portfolio rules, such as optimal profit>=current profit, defined with a nonlinear function, e.g. g(v)<=0), and finally,
  the bounds on the KPIs.

Maximizing or minimizing the variable values in the DDS optimization model of equation (13) helps determine the range of variable values possible during deal negotiation.

The computer system of the present application includes improvements and parameters designed to efficiently optimize nonlinear optimization models with nonlinear constraints. In particular, the techniques disclosed in the present application may lead to the following advantages:
  quick and efficient derivative calculations of nonlinear functions (e.g. KPI functions) for appropriate variable values;
  efficient sequential optimization of similar problems by utilizing the results of previous optimization model solutions.

In particular, algorithms of the present application have been benchmarked against conventional methods. Specific optimization algorithms of the present application include the following: matrix operations, unconstrained nonlinear optimization algorithms (conjugate gradient methods, and limited memory quasi-Newton methods), and Lagrangian relaxation methods (using Augmented Lagrangian penalty functions). These were benchmarked using the Constrained and Unconstrained Test Environment (CUTE) data set against open source algorithms found in "R" and Matlab. "R" uses a limited memory Broyden-Fletcher Goldfarb Shanno (BFGS) algorithm, which is a quasi-Newton method, and Matlab uses derivative free algorithms.

Performance tests have shown that assuming linearity for derivative calculations, checking for convergence later, and using sequential optimization are advantageous for certain nonlinear modeling functions (e.g. objective, nonlinear KPI functions). In a few cases involving a significant number of constraints, a more straightforward approach is useful; accordingly, the techniques of the present application enable characteristics of the algorithms to be controlled using optimization parameters.

One optimization is to assume certain characteristics about a particular nonlinear modeling function (e.g. a KPI function). For example, selecting an option could cause modeling to be carried out as though the nonlinear modeling function were linear or quadratic. If the option is selected, the derivatives are calculated at the initial current point, and then during the usage of the optimization algorithms, the nonlinear modeling function is assumed to be linear or quadratic. Once the variables of the optimization algorithm converge, the derivative at a new optimal point is re-confirmed against the current derivative. In case of differences, the opportunity curve optimization model of equation (14) is solved again, starting from the new optimal point.

In the more straightforward approach referred to above, no assumptions are made regarding the nonlinear modeling function. The user can choose the optimization parameters, e.g. from a BAdI that helps the user to balance between speed of optimization and accuracy of optimization. Based on performance testing, it has been found that for opportunity curve optimization models involving a significant number of constraints that restrict the feasible space, assuming linearity of the nonlinear modeling function leads to longer optimization time due to the need for re-solving until convergence.

BAdIs can be used for nonlinear modeling function (e.g. KPI) calculation and calculating derivatives of the nonlinear modeling function (e.g. derivatives of KPIs). According to a specific example, KPIs such as NPV and RAROC can be calculated using conventional techniques. Advanced Business Application Programming (ABAP) code can be used to calculate exact values for the KPI derivatives based on mathematical functional forms based on those described with respect to FIG. 1 (e.g. equations 3 and 4).

In case the KPI derivatives are too difficult to calculate precisely, the optimizer may include methods to calculate the derivative values using linear extrapolation between KPI calculations around the actual driver value. For example, KPI (rate+0.0001) and KPI(rate−0.0001) can be used to estimate the derivative in between.

In addition, several optimization parameters can be used for derivative estimations. If the underlying KPI calculation is linear (B.x+C) or quadratic (A*x^2+B.x+C) in nature or can be approximated as those, the optimizer has algorithms to determine the appropriate parameters (A, B, and C) and use the approximated forms to calculate efficient derivative values. Additional checks are present in the algorithms to compare the derivative values at the current driver value and the optimal driver value for violations of an underlying assumption regarding linearity or quadratic nature, and re-tuning of parameters and re-solving of optimization problems can be performed as required. Thus, when output values calculated by processing input values through a modeling function of a certain degree (e.g. the modeling function is a third degree polynomial equation) do not correspond to the output values that would be expected when processing inputs through a function of that degree, the modeling function can be modified.

For an opportunity curve determined for a pricing event, as depicted in the graph 515, multiple optimization problems may need to be solved that have the same feasible variable space (determined by the bounds of the driver variable values), and the same constraints (determined based on business rules). A difference between the optimization problems might involve variation in lambda value, where the lambda value is a scaling factor between the two KPIs of the opportunity curve (e.g. as depicted in the graph 515).

There may be several instances where the same opportunity curve optimization model is re-solved with a slightly modified objective function (i.e. multiple optimization problems, not necessarily multiple KPI functions).

For the opportunity curve, the same optimization model is re-solved with different lambda values, but without changing anything else (the KPIs involved, or the constraints).

For the deal decision support scenario, the same optimization model is solved once by maximizing the objective (in this case the variable), and once by minimizing the objective—to determine the variable bounds, without changing the constraints.

When KPIs are assumed linear or quadratic, for each lambda value, the same optimization model may be re-solved multiple times with new derivative information until there is convergence to the optimal solution.

The set of optimization problems that have to be solved, including all bounds and linear and nonlinear constraints are given in equation (14), with v as the vector of variables, $f_x$ and $f_y$ as the main KPIs considered for tradeoff, $\lambda$ as the scaling factor, l and u as the lower and upper bounds vectors, a and b as the matrices that define linear constraints, and g(v) defining additional secondary KPIs with their bounds.

$$\text{For } \lambda \in 1 \ldots k, \text{ solve } k \text{ problems} \quad (14)$$

$$\max f_Y(v) + \lambda * f_X(v)$$

$$\text{subject to } l \leq v \leq u$$

$$a.v \leq b$$

$$g(v) \leq 0$$

An example of a nonlinear objective function is as follows:

$$\pi = \text{PRFT} + \lambda * \text{VOL} = \Sigma_i e^{q0 - \beta_i v_i^1 - y_i v_i^2}(a_i v_i^1 + a_i v_i^2 - C + \lambda) \quad (15)$$

In some of the optimization problems that are solved, volume and unit sales for a product are based on the modeler functional forms, and as such, exact derivative calculations are possible; and the optimizer does not make any assumptions regarding them. For user specified KPI functions that are coded in BAdIs, the exact derivative information may not be available readily. In such cases, the user can specify the optimizer parameter for the associated KPI and allow an assumption of linearity or quadratic nature. In these cases, sequential optimization may be useful.

During sequential optimization, a first optimization problem solved may use a current driver variable value set. Subsequent optimization problems do not start at the current point, but rather from the optimal solution of the most recently solved optimization problem. For example, if the first problem is solved for lambda=0.1, the next problem that is solved for lambda=0.2 will use the optimal solution from lambda=0.1; and the next problem for lambda=0.3 will use the solution from the previous problem of lambda=0.2, and so on.

In general, conventional methods (e.g. open source methods) would solve a sequence of opportunity curve optimization models—and start each optimization sequence using the current point.

However, in some embodiments of the present application, the optimal solution from a previously solved optimization problem can be used. In many cases, the optimal solution from a previously solved optimization problem (e.g. the first optimization problem) is close to the optimal solution of the current optimization problem due to the minor changes in lambda values, or the direction of search for the new objective function—since the underlying feasible variable space does not change. Thus, the use of the optimal solution from a previous optimization problem may lead to more efficient processing of the optimization problem in comparison to conventional methods. This usage of sequential optimization can be turned on or off using additional optimization parameters.

In a simple example, sequential optimization with an assumption of linearity might be as follows:

1. current rate=3.5; and when derivative calculation is not available in the BAdI, the optimizer calculates the function value at (rate=3.4999), and (rate=3.5001)—and interpolates between the two function values to determine the approximate gradient/derivative.
2. This initial gradient value is stored, and the optimization algorithms use this derivative value in all calculations.
3. Once the algorithms converge (i.e. the variable values converge to the optimal value, in this case, the optimal rate), assuming optimal rate=3.76; then the derivative can be recalculated without the assumption of linearity.
4. If the gradient values at (rate=3.5), and (rate=3.76) are significantly different, then return to step 2—and use the new derivative value
5. Steps 2-4 continue until there is no significant difference in derivative values.

The optimizer also uses the extreme bounded solution (where all the driver values are pushed to either the minimum/maximum bounds based on their derivative direction) in case there is a significant improvement in the output values of objective function. This usage of a boundary solution can also be turned on/off as required.

FIG. 6 shows input values, output values calculated using the input values, and probabilities of future system operations based on conditions defined by the input values. A pricing event detail screen 601 shows characteristics of multiple product segments.

For the product segment selected in the pricing event detail screen 601, the deal decision support screen 603 provides the following:

- a driver value column 605;
- a relative weight column 607;
- the other columns in the deal decision support screen 603 show KPI values calculated using variable values depicted in the variable value column 605.

In the driver value column 605, variable values around the optimal rates are provided. The driver values are evenly spaced between upper and lower boundaries and the number of deal scenarios shown corresponds to the number of points specified in the number of points field 507. The upper and lower boundaries for the driver values are estimated based on the KPI bounds provided in the maximum up field 511 and maximum down field 513. The DDS optimization problems are solved in order to determine the upper and lower boundaries of the driver values. In particular, the optimization model of equation (13) may be understood as a set of DDS optimization problems.

Once the boundaries are determined, and the evenly spaced driver values calculated, the remaining KPI value determination is based on the underlying modeler equations (also referred to as functional forms), and KPI calculation and aggregation BAdIs. The equation chosen for the KPIs depends on the product type and science models corresponding to the product type. For products of the origination product type, such as money markets, an acquisition model similar to the response function of equation (3) could be used. For products of the renewal product type, such as CDs, multinomial logit function of equation (5) could be used.

The relative weight column 607 shows the probability that a future system operation will be carried out with the driver value in the corresponding field of the driver value column 605, relative to the probability that the future system operation will be carried out when the variable value is at the optimum rate (in the example of FIG. 6 the optimal rate is 4.78). The relative weight is calculated using the relative probability of increased or decreased unit sales for the pricing segment when compared to the optimal driver value. As the price elasticity determined by the modeler for the specific pricing segment is used in order to calculate the relative weights, values are generated to enable a decision to be made regarding how much variation is reasonable for each segment. For example, highly sensitive pricing segments might need only minor changes from current or optimal rates to achieve an increased probability to close the deal and get the loan, in comparison to less sensitive pricing segments.

According to the example depicted in FIG. 6, the annual profit, mortgage production volume, and unit sales for each pricing product are shown relative to the change in variable value (i.e. driver variable value). For a five year adjustable rate mortgage and a loan to value ratio that is less than 65%, the optimal rate is calculated to be 4.78. A reduction in the value of the variable from the optimal rate has a negative effect on the KPI for annual profit, and positive effects on the mortgage production (volume) and unit sales KPIs. Based on the future system operations depicted in FIG. 6, the user has the information needed to decide on the lowest possible variable value that can be used for the selected pricing segment in order to increase the probability that the future system operation will occur, while ensuring that KPIs remain at the appropriate levels. In addition, the user can check similar pricing segments for cannibalization effects and attempt to carry out alternative future system operations if these operations are determined to be more beneficial.

Figure 7:
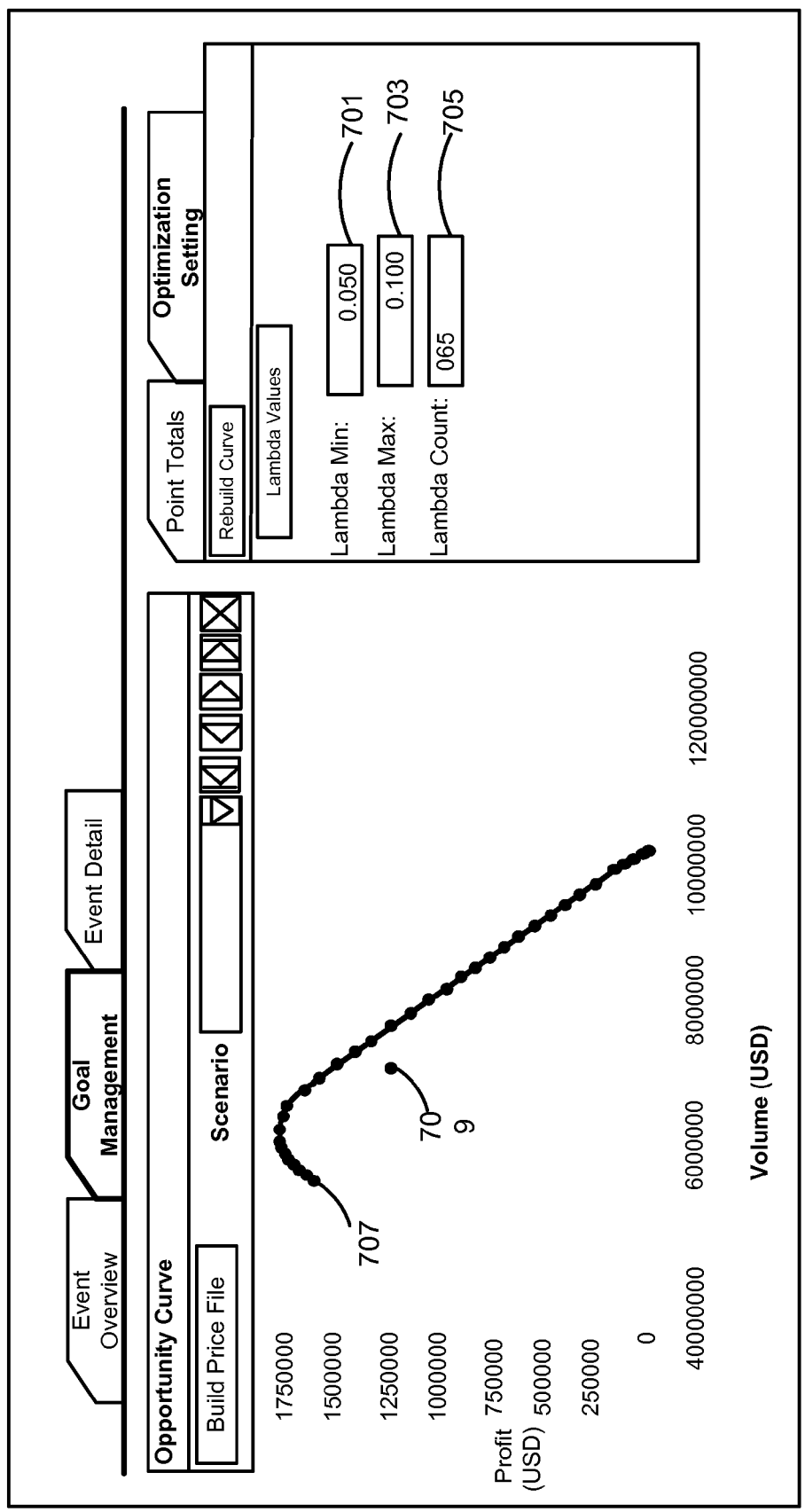
FIG. 7 shows an example of sequential optimization.

FIG. 7 shows an example of sequential optimization. For sequential optimization to determine the opportunity curve, the lambda value is varied from a lambda min 701 to a lambda max 703. As can be seen from a lambda count 705, there are 65 lambda values used. Also, as can be seen from the clustering of points to the extreme left and right parts of the curve, when strong constraints are set on the optimization model (as defined in equation (14)), the optimal points at the ends are quite close to each other. During sequential optimization, a first optimal point 707 (the leftmost point) is calculated by starting from a current point 709 (in red) in the algorithm. For the second optimization, the algorithm can start by using the optimal point 707 of the first model.

Figure 8:
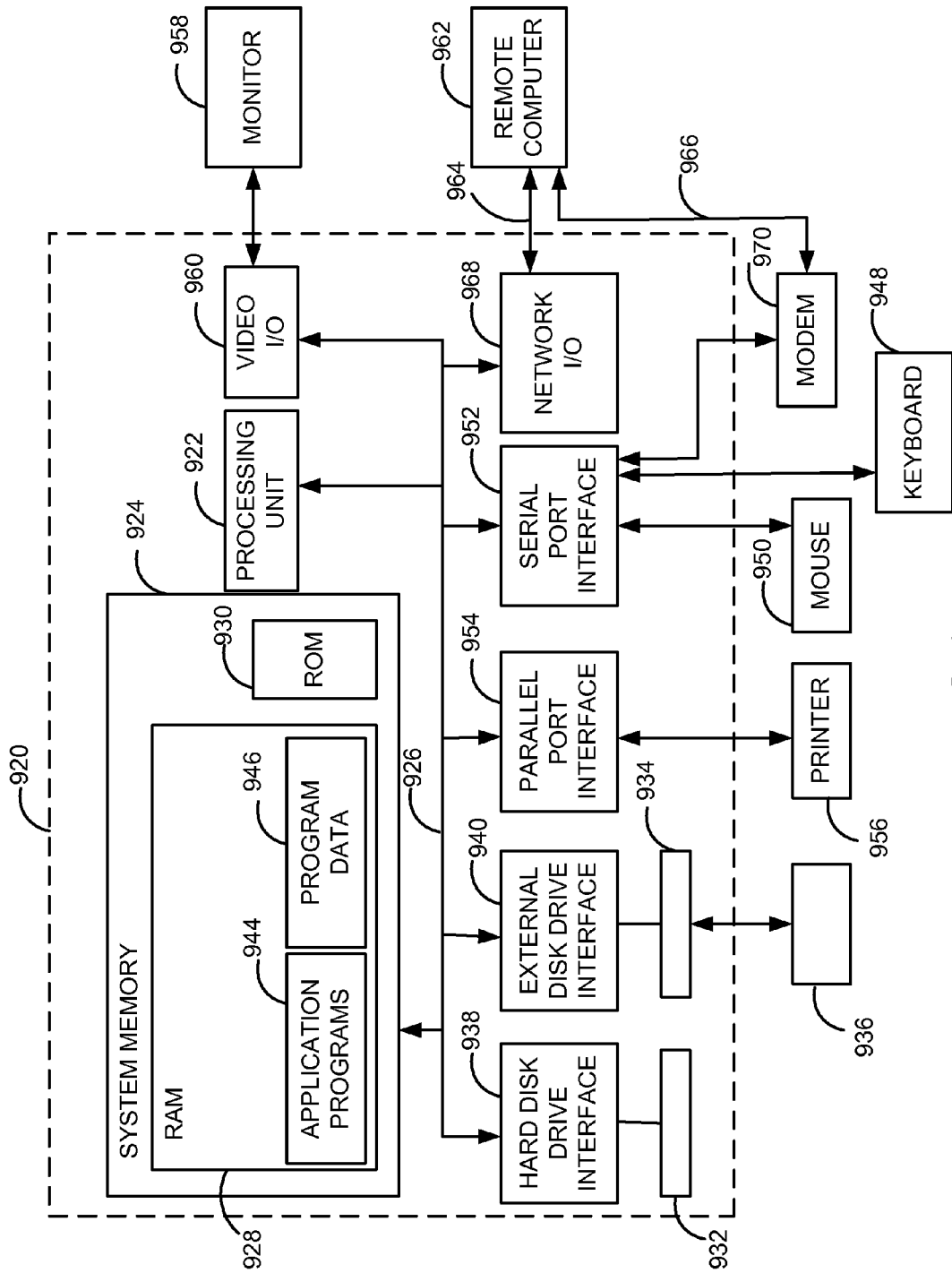
FIG. 8 shows a block diagram of an exemplary computer (network) system

FIG. 8 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the for managing operations of a system. The relevant data may be organized in a database, for example a relational or object database.

Although the exemplary environment described herein employs a hard disk (not shown) and an external disk 936, it should be appreciated by those skilled in the art that other types of non-transitory computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 7.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 8 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 8 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore, other data relevant to managing operations of a system (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for managing operations of a system.

According to an aspect, a computer implemented method of managing operations of a system is provided. The method may comprise deriving a nonlinear modeling function from a nonlinear response function, wherein the nonlinear modeling function models an affinity between multiple variables, wherein the multiple variables define one or more characteristics of the operations of the system, and wherein the nonlinear modeling function approximates one or more operations of the system. The method may further comprise defining an allowed range for output values of the nonlinear modeling function. The method may further comprise determining a range of a first set of input values of the nonlinear modeling function based on the allowed range of the output values, wherein a boundary of the range of the first set of input values is an optimal input value, wherein the optimal input value can be processed through the nonlinear modeling function to produce an optimal output value. The method may further comprise deriving a nonlinear probability function from the nonlinear response function. The method may further comprise receiving the first set of input values. The method may further comprise calculating the output values by processing each input value in the first set of input values through the nonlinear modeling function. The method may further comprise determining, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value. The method may further comprise displaying, for each input value in the first set of input values, the corresponding output value and the corresponding probability.

The probability of the first future system operation may be represented as a relative weight.

The computer implemented method may also be suitable for optimizing key performance indicators of financial products.

Also, the nonlinear modeling function may model product affinity and/or cannibalization.

In addition, the input values may replace an optimization pricing variable when calculating the output values.

Moreover, the output values may be key performance indicators. The allowed range for the output values may be received by means of user input.

The first future system operation may be completion of a deal or transaction with a customer.

In some cases, the method further comprises using techniques of unobserved component models are used in the nonlinear modeling function in order to provide a serial correlation between events that have a close chronological relationship.

Serial correlation may be understood to refer to a relationship between the values of a variable over successive time intervals.

In some cases, the method further comprises collecting a historical data set from the operations of the system. The method may further comprise loading the historical data set into a database. Deriving the nonlinear modeling function may comprise using the historical data set.

The historical data set may include client data, external data, and/or macroeconomic indicators. Operations of the system may be customer transactions.

Also, it may be that loading the historical data set further comprises aggregating and clustering the historical data set.

Moreover, processing the first set of input values may comprise replacing a first variable of the nonlinear modeling function with each value in the first set of input values. Each output value may be calculated using an input value in the first set of input values.

Calculating the output values may further comprise processing a second set of input values through the nonlinear modeling function. Also, processing the second set of input values comprises replacing a second variable of the nonlinear modeling function with each value in the second set of input values. Each output value may be calculated using an input value in the second set of input values.

Furthermore, the range of the first set of input values is determined based on one or more of the following: movement rules, linear constraints based on business rules, and nonlinear constraints based on portfolio level rules.

Also, the method may further comprise deriving a linear modeling function from a linear utility function. The method may further comprise calculating output values of the linear modeling function by processing the first set of input values through the linear modeling function. Moreover, displaying the corresponding output value and the corresponding probability may further comprise displaying, for each input value of the first set of input values, the corresponding output value of the linear modeling function.

It may be that calculating the output values comprises performing an approximation. Accordingly, the method may further comprise modifying the nonlinear modeling function when the calculated output values do not correspond to a degree of the nonlinear modeling function.

Moreover, the method may further comprise determining a number of future system operations performed based on the relative probability of performing the first future system operation and the output of a segmentation model based on customer relationship management attributes.

In addition, the method the nonlinear modeling function may be $$\frac{\mathrm{Exp}(\beta_{client} r_{client}(t))}{\mathrm{Exp}(\beta_{comp} r_{comp}(t)) + \mathrm{Exp}(\beta_{client} r_{client}(t))},$$

wherein $r^{client}(t)$ is the first variable, wherein $r^{comp}(t)$ is given a constant value, and wherein $\beta$ is sensitivity of the output values to a change in $r^{client}(t)$.

Moreover, the probability function may be $$\mathrm{Exp}(\beta_i(X_i(\mathrm{DDS}) - X_i(\mathrm{Opt})),$$

wherein, when calculating the output values, $X_i(\mathrm{DDS})$ is replaced by each input value in the first set of input values, and wherein $X_i(\mathrm{Opt})$ is replaced by the optimal input value, and wherein $\beta_i$ is the sensitivity of $X_i$.

In some cases, the method further comprises deriving a multinomial logit function from the nonlinear response function. The method may further comprise processing the input values through the multinomial logit function in order to determine a relative probability of a second future system operation.

The second future system operation may be a situation where a user faces multiple choices.

According to another aspect, a computer program product comprising computer-readable instructions is provided. The computer-readable instructions, when loaded and executed on a computer system, cause the computer system to operate according to the method described above.

According to yet another aspect, a computer system for managing the operations of a system is provided. The computer system may comprise a database configured to store a historical data set, a processor, and a graphical user interface. The processor may be configured to execute instructions that cause the computer system to perform the following operation: derive a nonlinear modeling function from a nonlinear response function, wherein the nonlinear modeling function models an affinity between multiple variables, wherein the multiple variables define one or more characteristics of the operations of the system, and wherein the nonlinear modeling function approximates one or more operations of the system. In addition, the processor may be configured to execute instructions that cause the computer system to perform the following operations: define an allowed range for output values of the nonlinear modeling function, and determine a range of a first set of input values of the nonlinear modeling function based on the allowed range of the output values, wherein a boundary of the range of the first set of input values is an optimal input value, wherein the optimal input value can be processed through the nonlinear modeling function to produce an optimal output value. Also, the processor may be configured to execute instructions that cause the computer system to perform the following operations: derive a nonlinear probability function from the nonlinear response function, receive the first set of input values, and calculate the output values by processing each input value in the first set of input values through the nonlinear modeling function. The processor may also be configured to execute instructions that cause the computer system to perform the following operation: determine, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value. The graphical user interface may be configured to display, for each input value in the first set of input values, the corresponding output value and the corresponding probability.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for managing operations of a system, the method comprising:
   deriving a nonlinear modeling function from a nonlinear response function, wherein the nonlinear modeling function models an affinity between multiple variables, wherein the multiple variables define one or more characteristics of the operations of the system, and wherein the nonlinear modeling function approximates one or more operations of the system;
   defining an allowed range for output values of the nonlinear modeling function;
   determining a range of a first set of input values of the nonlinear modeling function based on the allowed range of the output values, wherein a boundary of the range of the first set of input values is an optimal input value, wherein the optimal input value can be processed through the nonlinear modeling function to produce an optimal output value;
   deriving a nonlinear probability function from the nonlinear response function;
   receiving the first set of input values;
   calculating the output values by processing each input value in the first set of input values through the nonlinear modeling function;
   determining, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value; and
   displaying, for each input value in the first set of input values, the corresponding output value and the corresponding probability.

2. The computer-implemented method of claim 1, wherein techniques of unobserved component models are used in the nonlinear modeling function in order to provide a serial correlation between events that have a close chronological relationship.

3. The computer-implemented method of claim 1, further comprising:
   collecting a historical data set from the operations of the system; and
   loading the historical data set into a database;
   wherein deriving the nonlinear modeling function comprises using the historical data set.

4. The computer-implemented method of claim 3, wherein loading the historical data set further comprises aggregating and clustering the historical data set.

5. The computer-implemented method of claim 1, wherein processing the first set of input values comprises replacing a first variable of the nonlinear modeling function with each value in the first set of input values and wherein each output value is calculated using an input value in the first set of input values.

6. The computer-implemented method of claim 5,
   wherein calculating the output values further comprises processing a second set of input values through the nonlinear modeling function; and
   wherein processing the second set of input values comprises replacing a second variable of the nonlinear modeling function with each value in the second set of input values; and
   wherein each output value is calculated using an input value in the second set of input values.

7. The computer-implemented method of claim 1, wherein the range of the first set of input values is determined based on one or more of the following: movement rules, linear constraints based on business rules, and nonlinear constraints based on portfolio level rules.

8. The computer-implemented method of claim 1, further comprising:
   deriving a linear modeling function from a linear utility function; and
   calculating output values of the linear modeling function by processing the first set of input values through the linear modeling function;
   wherein displaying the corresponding output value and the corresponding probability further comprises displaying, for each input value of the first set of input values, the corresponding output value of the linear modeling function.

9. The computer-implemented method of claim 1, wherein calculating the output values comprises performing an approximation, the method further comprising:
   modifying the nonlinear modeling function when the calculated output values do not correspond to a degree of the nonlinear modeling function.

10. The computer-implemented method of claim 1, further comprising:
    determining a number of future system operations performed based on the relative probability of performing the first future system operation and the output of a segmentation model based on customer relationship management attributes.

11. The computer-implemented method of claim 5, wherein the nonlinear modeling function is $$\frac{\operatorname{Exp}(\beta_{client} r_{client}(t))}{\operatorname{Exp}(\beta_{comp} r_{comp}(t)) + \operatorname{Exp}(\beta_{client} r_{client}(t))},$$

wherein $r_{client}(t)$ is the first variable, wherein $r_{comp}(t)$ is given a constant value, and wherein $\beta$ is sensitivity of the output values to a change in $r_{client}(t)$.

12. The computer-implemented method of claim 1, wherein the probability function is $$\operatorname{Exp}(\beta_i(X_i(\mathrm{DDS}) - X_i(\mathrm{Opt})),$$

wherein, when calculating the output values, $X_i(\mathrm{DDS})$ is replaced by each input value in the first set of input values, and wherein $X_i(\mathrm{Opt})$ is replaced by the optimal input value, and wherein $\beta$ is the sensitivity of $X_i$.

13. The computer-implemented method of claim 1, further comprising:
deriving a multinomial logit function from the nonlinear response function; and
processing the input values through the multinomial logit function in order to determine a relative probability of a second future system operation.

14. A computer system for managing the operations of a system, the computer system comprising:
a database configured to store a historical data set;
a processor; and
a graphical user interface;
wherein the processor is configured to execute instructions that cause the computer system to perform the following operations:
derive a nonlinear modeling function from a nonlinear response function, wherein the nonlinear modeling function models an affinity between multiple variables, wherein the multiple variables define one or more characteristics of the operations of the system, and wherein the nonlinear modeling function approximates one or more operations of the system;
define an allowed range for output values of the nonlinear modeling function;
determine a range of a first set of input values of the nonlinear modeling function based on the allowed range of the output values, wherein a boundary of the range of the first set of input values is an optimal input value, wherein the optimal input value can be processed through the nonlinear modeling function to produce an optimal output value;
derive a nonlinear probability function from the nonlinear response function;
receive the first set of input values;
calculate the output values by processing each input value in the first set of input values through the nonlinear modeling function, wherein the nonlinear modeling function approximates one or more operations of the system; and
determine, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value;
wherein the graphical user interface is configured to display, for each input value in the first set of input values, the corresponding output value and the corresponding probability.

15. The computer system of claim 14 wherein techniques of unobserved component models are used in the nonlinear modeling function in order to provide a serial correlation between events that have a close chronological relationship.

16. The computer system of claim 14 wherein the processor is further configured to execute instructions that cause the computer system to perform the following operations:
collect a historical data set from the operations of the system; and
load the historical data set into a database;
wherein the operations of deriving the nonlinear modeling function comprises using the historical data set.

17. The computer system of claim 14 wherein the operations of processing the first set of input values comprises operations of replacing a first variable of the nonlinear modeling function with each value in the first set of input values and wherein each output value is calculated using an input value in the first set of input values.

18. The computer system of claim 14 wherein the processor is further configured to execute instructions that cause the computer system to perform the following operations:
derive a linear modeling function from a linear utility function; and
calculate output values of the linear modeling function by processing the first set of input values through the linear modeling function;
wherein the graphical user interface is configured to display, for each input value of the first set of input values, the corresponding output value of the linear modeling function.

19. The computer system of claim 14 wherein the processor is further configured to execute instructions that cause the computer system to perform the following operation:
determining a number of future system operations performed based on the relative probability of performing the first future system operation and the output of a segmentation model based on customer relationship management attributes.

20. A computer program product comprising computer-readable instructions embodied on a non-transitory computer-readable medium, which, when loaded and executed on a computer system, cause the computer system to perform the following operations:
derive a nonlinear modeling function from a nonlinear response function, wherein the nonlinear modeling function models an affinity between multiple variables, wherein the multiple variables define one or more characteristics of the operations of the system, and wherein the nonlinear modeling function approximates one or more operations of the system;
define an allowed range for output values of the nonlinear modeling function;
determine a range of a first set of input values of the nonlinear modeling function based on the allowed range of the output values, wherein a boundary of the range of the first set of input values is an optimal input value, wherein the optimal input value can be processed through the nonlinear modeling function to produce an optimal output value;
derive a nonlinear probability function from the nonlinear response function;
receive the first set of input values;

calculate the output values by processing each input value in the first set of input values through the nonlinear modeling function, wherein the nonlinear modeling function approximates one or more operations of the system;

determine, using the probability function, a relative probability of performing a first future system operation for each input value of the first set of input values, wherein, for each input value of the first set of input values, the relative probability shows a probability of performing the first future system operation for the corresponding input value relative to a probability of performing the first future system operation for the optimal input value; and display, for each input value in the first set of input values, the corresponding output value and the corresponding probability.

* * * * *